United States Patent
Morishige et al.

(10) Patent No.: US 11,408,042 B2
(45) Date of Patent: Aug. 9, 2022

(54) METHOD FOR MANUFACTURING GRAIN-ORIENTED ELECTRICAL STEEL SHEET AND GRAIN-ORIENTED ELECTRICAL STEEL SHEET

(71) Applicant: NIPPON STEEL CORPORATION, Tokyo (JP)

(72) Inventors: Nobusato Morishige, Tokyo (JP); Takashi Kataoka, Tokyo (JP); Haruhiko Atsumi, Tokyo (JP); Yasuhiro Mayumi, Tokyo (JP); Atsushi Suzuki, Tokyo (JP); Tomoya Suenaga, Tokyo (JP); Teruyuki Tamaki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 136 days.

(21) Appl. No.: 16/980,461

(22) PCT Filed: Mar. 20, 2019

(86) PCT No.: PCT/JP2019/011668
§ 371 (c)(1),
(2) Date: Sep. 14, 2020

(87) PCT Pub. No.: WO2019/182004
PCT Pub. Date: Sep. 26, 2019

(65) Prior Publication Data
US 2021/0047704 A1 Feb. 18, 2021

(30) Foreign Application Priority Data
Mar. 20, 2018 (JP) .............................. JP2018-052900

(51) Int. Cl.
*C21D 8/12* (2006.01)
*C21D 9/46* (2006.01)
(Continued)

(52) U.S. Cl.
CPC ......... *C21D 8/1244* (2013.01); *C21D 8/1222* (2013.01); *C21D 8/1233* (2013.01);
(Continued)

(58) Field of Classification Search
CPC ... C21D 1/26; C21D 1/28; C21D 1/30; C21D 6/00; C21D 6/005; C21D 6/008;
(Continued)

(56) References Cited

U.S. PATENT DOCUMENTS

2013/0087249 A1\* 4/2013 Takenaka .............. C22C 38/001
148/645
2015/0211089 A1 7/2015 Fukunaga et al.
(Continued)

FOREIGN PATENT DOCUMENTS

CA 3 014 035 A1 8/2017
EP 0 334 223 A2 9/1989
(Continued)

OTHER PUBLICATIONS

"Methods of measurement of the magnetic properties of magnetic steel sheet and strip by means of a single sheet tester", JIS C 2556, 1996, total 6 pages.
(Continued)

*Primary Examiner* — Vanessa T. Luk
(74) *Attorney, Agent, or Firm* — Birch, Stewart, Kolasch & Birch, LLP

(57) ABSTRACT

A method for manufacturing a grain-oriented electrical steel sheet including a step of hot-rolling a slab containing a predetermined component composition with a remainder including Fe and an impurity to obtain a hot-rolled steel sheet, a step of, after carrying out hot-rolled steel sheet annealing on the hot-rolled steel sheet, carrying out cold rolling to obtain a cold-rolled steel sheet, a step of carrying out primary recrystallization annealing including a rapid
(Continued)

temperature increase at an average temperature increase velocity V of 400° C./s or more and imparting of a steel sheet tensile force S on the cold-rolled steel sheet, and a step of applying an annealing separating agent to a surface of the cold-rolled steel sheet after the primary recrystallization annealing and then carrying out flattening annealing.

1 Claim, 3 Drawing Sheets

(51) Int. Cl.
    *C22C 38/00* (2006.01)
    *C22C 38/02* (2006.01)
    *C22C 38/04* (2006.01)
    *C22C 38/06* (2006.01)
    *C22C 38/60* (2006.01)
(52) U.S. Cl.
    CPC ............ *C21D 8/1283* (2013.01); *C21D 9/46* (2013.01); *C22C 38/001* (2013.01); *C22C 38/02* (2013.01); *C22C 38/04* (2013.01); *C22C 38/06* (2013.01); *C22C 38/60* (2013.01); *C21D 2201/05* (2013.01)
(58) Field of Classification Search
    CPC ........ C21D 9/46; C21D 9/48; C21D 2201/05; C21D 8/12
    See application file for complete search history.

(56) References Cited

U.S. PATENT DOCUMENTS

| 2016/0020006 A1 | 1/2016 | Watanabe et al. |
| 2017/0088915 A1 | 3/2017 | Suehiro et al. |
| 2017/0240987 A1 | 8/2017 | Nagoshi et al. |
| 2019/0055619 A1 | 2/2019 | Imamura et al. |

FOREIGN PATENT DOCUMENTS

| EP | 0 936 275 A1 | 8/1999 |
| EP | 2 584 054 A1 | 4/2013 |
| EP | 3 196 320 A1 | 7/2017 |
| JP | 7-268567 A | 10/1995 |
| JP | 10-280041 A | 10/1998 |
| JP | 2014-47411 A | 3/2014 |
| JP | 2014-152392 A | 8/2014 |
| JP | 2017-222898 A | 12/2017 |
| KR | 10-2017-0044723 A | 4/2017 |
| WO | WO 2017/154929 A1 | 9/2017 |

OTHER PUBLICATIONS

"Test methods for electrical steel strip and sheet—Part 1: Methods of measurement of the magnetic properties of electrical steel strip and sheet by means of an Epstein frame", JIS C 2550-1, 2011, total 22 pages.

Lyakishev, "Encyclopedic Dictionary of Metallurgy," vol. 2, Intermet Engineering, 2000, pp. 231-232, 3 pages total.

* cited by examiner

METHOD FOR MANUFACTURING GRAIN-ORIENTED ELECTRICAL STEEL SHEET AND GRAIN-ORIENTED ELECTRICAL STEEL SHEET

TECHNICAL FIELD OF THE INVENTION

The present invention relates to a method for manufacturing a grain-oriented electrical steel sheet and a grain-oriented electrical steel sheet.

Priority is claimed on Japanese Patent Application No. 2018-052900, filed Mar. 20, 2018, the content of which is incorporated herein by reference.

RELATED ART

A grain-oriented electrical steel sheet is a steel sheet which contains 2% by mass to 5% by mass of Si and in which the orientations of crystal grains in the steel sheet are highly integrated along a {110}<001> orientation called a Goss orientation. Grain-oriented electrical steel sheets have an excellent magnetic characteristic and are thus used for core materials and the like of stationary inductors such as transformers.

Crystal orientations in a grain-oriented electrical steel sheet can be controlled using a catastrophic grain growth phenomenon called secondary recrystallization. In addition, it is confirmed that, when the temperature of a steel sheet is rapidly increased in a temperature increase process for primary recrystallization annealing carried out ahead of secondary recrystallization, it is possible to increase crystal grains in a Goss orientation having a favorable magnetic characteristic after the primary recrystallization annealing.

Therefore, studies are underway regarding a variety of conditions for a rapid temperature increase in the temperature increase process for primary recrystallization annealing in order to improve the magnetic characteristic of grain-oriented electrical steel sheets.

For example, Patent Document 1 discloses a technique for homogenizing the temperature distribution of a steel sheet in a sheet width direction and improving the product quality of a grain-oriented electrical steel sheet by regulating the disposition position of a rapid heating device in a continuous annealing apparatus. Patent Document 2 discloses a technique for suppressing a temperature variation in a steel sheet and suppressing an iron loss variation of a grain-oriented electrical steel sheet by controlling the heat pattern and the atmosphere in a temperature increase process for primary recrystallization annealing. Patent Document 3 discloses a technique for strictly controlling the average grain size of crystal grains after secondary recrystallization and the deviation angle from an ideal orientation by rapidly increasing the temperature of a steel sheet and then rapidly cooling the steel sheet in primary recrystallization annealing. Patent Document 4 discloses a technique for reducing the iron loss of a grain-oriented electrical steel sheet by rapidly heating the steel sheet in a temperature increase phase for decarburization annealing.

PRIOR ART DOCUMENT

Patent Document

[Patent Document 1] Japanese Unexamined Patent Application, First Publication No. 2014-47411

[Patent Document 2] Japanese Unexamined Patent Application, First Publication No. 2014-152392

[Patent Document 3] Japanese Unexamined Patent Application, First Publication No. H7-268567

[Patent Document 4] Japanese Unexamined Patent Application, First Publication No. H10-280041

DISCLOSURE OF THE INVENTION

Problems to be Solved by the Invention

In the related art described above, depending on the conditions for the rapid temperature increase in primary recrystallization annealing, there is a case where protrusion and recesses (also referred to as wrinkles) are generated on the surface of a grain-oriented electrical steel sheet to be obtained in the end. When grain-oriented electrical steel sheets having protrusions and recesses on the surface are stacked together, voids are generated between the steel sheets, which decrease the stacking factor of a core material and degrades the performance of transformers. In Patent Document 4, the surface shape of the grain-oriented electrical steel sheet is evaluated; however, in the technique described in Patent Document 4, there is a case where the generation of fine protrusions and recesses cannot be sufficiently suppressed.

The present invention has been made in consideration of the above-described problem, and an object of the present invention is to provide a new and improved method for manufacturing a grain-oriented electrical steel sheet capable of manufacturing a grain-oriented electrical steel sheet having a more favorable surface shape in the case of rapidly increasing the temperature of the grain-oriented electrical steel sheet at a faster temperature increase velocity than in the related art in primary recrystallization annealing and a grain-oriented electrical steel sheet manufactured using the above-described manufacturing method. In addition, another object of the present invention is to provide a method for manufacturing a grain-oriented electrical steel sheet having a decreased iron loss value even when a magnetic domain refinement treatment is not carried out and a grain-oriented electrical steel sheet manufactured using the above-described manufacturing method.

Means for Solving the Problem

The summary of the present invention is as described below.

[1] A method for manufacturing a grain-oriented electrical steel sheet according to one aspect of the present invention including:

a step of heating a slab having
 a component composition containing, by mass %,
 C: 0.02% or more and 0.10% or less,
 Si: 2.5% or more and 4.5% or less,
 Mn: 0.01% or more and 0.15% or less,
 S and Se in total: 0.001% or more and 0.050% or less,
 acid-soluble Al: 0.01% or more and 0.05% or less, and
 N: 0.002% or more and 0.015% or less
 with a remainder including Fe and an impurity to 1,280° C. to 1,450° C. and carrying out hot rolling to obtain a hot-rolled steel sheet, a step of, after carrying out hot-rolled steel sheet annealing on the hot-rolled steel sheet, carrying out cold rolling once or carrying out cold rolling twice or more with process annealing therebetween to obtain a cold-rolled steel sheet, a step of carrying out primary recrystallization annealing on the cold-rolled steel sheet, a step of applying an annealing separating agent including MgO to a surface of the cold-rolled steel sheet after the primary recrystallization annealing and then carrying out final annealing to obtain a final-annealed sheet, and a step of applying an insulating coating to the final-annealed sheet and then carrying out flattening annealing, in which, in a temperature increase process for the primary recrystallization annealing, an average temperature increase velocity V (° C./s) in a temperature range of 550° C. to 700° C. is 400° C./s or more, T/L (° C./mm) that is a ratio of an amount of temperature increased T (° C.) in a series of temperature increase processes, including a temperature increase in the temperature range of 550° C. to 700° C., to a heated length L (mm) of the series of temperature increase processes is 0.1≤T/L≤4.0, a tensile force S (N/mm$^2$) imparted in a sheet travelling direction of the cold-rolled steel sheet is 1.96≤S≤(19.6-1.96×T/L), in the case of V≤1,000, the tensile force S is 1.96≤S≤(25.5-0.0137×V), and, in the case of V>1,000, the tensile force S is 1.96≤S≤11.8.

[2] A grain-oriented electrical steel sheet according to another aspect of the present invention having:

a silicon steel sheet, a forsterite coating disposed on the silicon steel sheet, and an insulating film disposed on the forsterite coating, in which the silicon steel sheet has a component composition containing, by mass %, Si: 2.5% or more and 4.5% or less, Mn: 0.01% or more and 0.15% or less, S and Se in total: 0% or more and 0.005% or less, acid-soluble Al: 0% or more and 0.01% or less, and N: 0% or more and 0.005% or less with a remainder including Fe and an impurity, an average grain size of secondary recrystallized grains in the silicon steel sheet is 10 mm or more and 50 mm or less, and the grain-oriented electrical steel sheet has a sheet thickness of 0.15 mm or more and 0.23 mm or less, an iron loss Wp of 0.800 W/kg or less in terms of $W_{17/50}$, a presence proportion of a wrinkle of 0 wrinkles/m or more and 10 wrinkles/m or less, the wrinkle having a steepness of 0.01 or more, in a sheet width direction, and a magnetic flux density B8 value of 1.930 T or more.

Effects of the Invention

According to the one aspect according to the present invention, it is possible to provide a grain-oriented electrical steel sheet having a more favorable surface shape in the case of rapidly increasing the temperature of the grain-oriented electrical steel sheet at a faster temperature increase velocity than in the related art in primary recrystallization annealing and having a decreased iron loss value even when a magnetic domain refinement treatment is not carried out and a manufacturing method therefor.

EMBODIMENTS OF THE INVENTION

Figure 1:
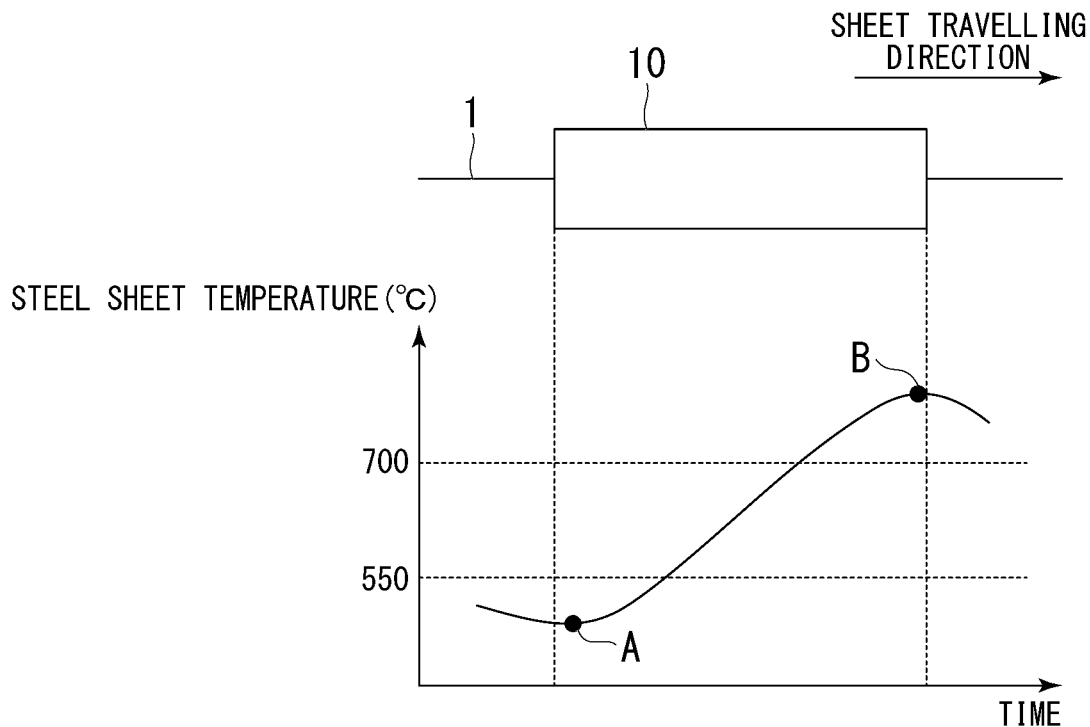
FIG. 1 is a view showing a specific example of a heat pattern in a temperature increase process for primary recrystallization annealing.

A preferred embodiment of the present invention will be described in detail with reference to drawings accompanied below. However, the present invention is not limited only to a configuration disclosed in the present embodiment and can be modified in a variety of manners within the scope of the gist of the present invention. In addition, in the present specification and the drawings, configurational elements having substantially the same functional configuration will be given the same reference symbol and will not be described again.

As a result of intensive studies regarding a grain-oriented electrical steel sheet and a method for manufacturing the grain-oriented electrical steel sheet in order to make the magnetic characteristic of the grain-oriented electrical steel sheet favorable, the present inventors obtained the following knowledge.

Specifically, the present inventors found that, in a grain-oriented electrical steel sheet, when the temperature is rapidly increased in a temperature range of 550° C. to 700° C. at an average temperature increase velocity of 400° C./s or more in a temperature increase process for primary recrystallization annealing, crystal grains in a Goss orientation (also referred to as Goss orientation grains) having a favorable magnetic characteristic increase after the primary recrystallization annealing. In addition, the present inventors found that, as the average temperature increase velocity during the rapid temperature increase for the primary recrystallization annealing becomes faster, the Goss orientation grains after the primary recrystallization increase, and the iron loss value of a grain-oriented electrical steel sheet to be obtained in the end decreases. When the average temperature increase velocity during the rapid temperature increase for the primary recrystallization annealing is set to be fast, it is possible to improve the integration degree of crystal grains in an ideal Goss orientation after secondary recrystallization, and the diameters of secondary recrystallized grains can be decreased, and thus it is possible to decrease the iron loss value of the grain-oriented electrical steel sheet even when a magnetic domain refinement treatment is not carried out.

Meanwhile, as a result of present inventors' studies, it has been clarified that, in the temperature increase process for the primary recrystallization annealing, the shape of the steel sheet significantly changes depending on the conditions for the rapid temperature increase. Specifically, it has been clarified that, at the time of the rapid temperature increase, depending on the intensity of a tensile force imparted in a sheet travelling direction of the steel sheet (hereinafter, also referred to as the steel sheet tensile force), protrusions and recesses (wrinkles) are generated on the surface of the steel sheet. In such a case, when the grain-oriented electrical steel sheets are stacked together in the manufacturing of a transformer, voids are generated between the steel sheets, and thus the stacking factor of a core material decreases, and the iron loss of the transformer increases.

As a cause for the shape of the steel sheet being changed by the rapid temperature increase in the primary recrystallization annealing, for example, a change in the sheet width of the steel sheet on a high-temperature side after the rapid temperature increase relative to the sheet width of the steel sheet on a low-temperature side before the rapid temperature increase caused by thermal expansion attributed to the rapid temperature increase is considered. In such a case, when the steel sheet tensile force is set to be excessively great, the steel sheet on the high-temperature side elongated by thermal expansion significantly shrinks in the sheet width direction, and thus it is considered that a significant shape difference is caused between the steel sheet on the low-temperature side and the steel sheet on the high-temperature side and wrinkles are formed. Therefore, in order to suppress the generation of wrinkles in the temperature increase process for the primary recrystallization annealing, it is important to prevent the steel sheet tensile force from becoming excessively great.

In addition, the present inventors found that the upper limit value of the steel sheet tensile force at which wrinkles are not generated in the grain-oriented electrical steel sheet is dependent on the temperature increase velocity during the rapid temperature increase in the primary recrystallization annealing. Specifically, the present inventors found that the upper limit value of the steel sheet tensile force becomes smaller as the temperature increase velocity during the rapid temperature increase becomes faster. This is considered to be because, as the temperature increase velocity during the rapid temperature increase becomes faster, the temperature difference between the steel sheet on the low-temperature side before the rapid temperature increase and the steel sheet on the high-temperature side after the rapid temperature increase becomes larger, and the steel sheet on the high-temperature side shrinks significantly as the counteraction of thermal expansion.

Furthermore, the present inventors found that, in the temperature increase process including a rapid temperature increase in a temperature range of 550° C. to 700° C., the relationship between an amount of temperature increased T (the difference between the temperature at the time of beginning the temperature increase process and the temperature at the time of ending the temperature increase process) and a heated length L (the steel sheet length from a position at the time of beginning the temperature increase process to a position at the time of ending the temperature increase process) has a significant influence on the shape of the steel sheet.

Specifically, the present inventors found that, as the amount of temperature increased T becomes smaller or the heated length L becomes longer, the number of wrinkles generated in a grain-oriented electrical steel sheet to be obtained becomes smaller. That is, the present inventors found that, as T/L that is a value obtained by dividing the amount of temperature increased T by the heated amount L becomes smaller, it is possible to obtain a grain-oriented electrical steel sheet having a more favorable shape. This is considered to be because T/L indicates the temperature change rate of the steel sheet in the sheet travelling direction, and thus, as T/L becomes larger, the temperature difference between the steel sheet on the low-temperature side and the steel sheet on the high-temperature side becomes larger, and wrinkles are more likely to be generated on the surface of the steel sheet due to the influence of thermal expansion.

In consideration of the above-described knowledge, the present inventors found the present invention. An embodiment of the present invention includes the following configuration.

A method for manufacturing a grain-oriented electrical steel sheet including:

a step of heating a slab having a component composition containing, by mass %,

C: 0.02% or more and 0.10% or less,

Si: 2.5% or more and 4.5% or less,

Mn: 0.01% or more and 0.15% or less,

S and Se in total: 0.001% or more and 0.050% or less, acid-soluble Al: 0.01% or more and 0.05% or less, and N: 0.002% or more and 0.015% or less with a remainder including Fe and an impurity to 1,280° C. to 1,450° C. and carrying out hot rolling to obtain a hot-rolled steel sheet, a step of, after carrying out hot-rolled steel sheet annealing on the hot-rolled steel sheet, carrying out cold rolling once or carrying out cold rolling twice or more with process annealing therebetween to obtain a cold-rolled steel sheet, a step of carrying out primary recrystallization annealing on the cold-rolled steel sheet, a step of applying an annealing separating agent including MgO to a surface of the cold-rolled steel sheet after the primary recrystallization annealing and then carrying out final annealing to obtain a final-annealed sheet, and a step of applying an insulating coating to the final-annealed sheet and then carrying out flattening annealing, in which, in a temperature increase process for the primary recrystallization annealing, an average temperature increase velocity V (° C./s) in a temperature range of 550° C. to 700° C. is 400° C./s or more, T/L (° C./mm) that is a ratio of an amount of temperature increased T (° C.) in a series of temperature increase processes, including a temperature increase in the temperature range of 550° C. to 700° C., to a heated length L (mm) of the series of temperature increase processes is $0.1 \leq T/L \leq 4.0$, a tensile force S (N/mm$^2$) imparted in a sheet travelling direction of the cold-rolled steel sheet is $1.96 \leq S \leq (19.6-1.96 \times T/L)$, in the case of $V \leq 1,000$, the tensile force S is $1.96 \leq S \leq (25.5-0.0137 \times V)$, and, in the case of $V > 1,000$, the tensile force S is $1.96 \leq S \leq 11.8$.

In a grain-oriented electrical steel sheet manufactured using the above-described manufacturing method, an iron loss Wp in the case of not carrying out a magnetic domain refinement treatment becomes 0.800 W/kg or less in terms of $W_{17/50}$. In the manufacturing method according to the present embodiment, it is possible to efficiently decrease the iron loss of the grain-oriented electrical steel sheet by rapidly increasing the temperature at the time of the primary recrystallization annealing.

In addition, in the manufacturing method according to the present embodiment, as described above, the steel sheet tensile force S, the average temperature increase velocity V, and T/L are comprehensively and inseparably controlled, whereby it is possible to reduce the influence of thermal expansion of the steel sheet. Therefore, it is possible to set the presence proportion of a wrinkle having a steepness of 0.01 or more in the sheet width direction to 0 wrinkles/m or more and 10 wrinkles/m or less.

Hereinafter, the method for manufacturing a grain-oriented electrical steel sheet according to the present embodiment having the above-described characteristics will be more specifically described.

First, the component composition of the slab used in the method for manufacturing a grain-oriented electrical steel sheet according to the present embodiment will be described. Hereinafter, unless particularly otherwise described, the "%" sign indicates "% by mass". Numerical limitation ranges described below include the lower limit value and the upper limit value in the ranges. Numerical values expressed using "more than" or "less than" are not included in numerical ranges.

The amount of carbon (C) is 0.02% or more and 0.10% or less. C has a variety of functions, and, in a case where the amount of C is less than 0.02%, the crystal grain diameters become excessively large during the heating of the slab, which increases the iron loss value of the grain-oriented electrical steel sheet. In a case where the amount of C is more than 0.10%, at the time of decarburization after the cold rolling, the decarburization time becomes long, and the manufacturing cost increases. In addition, in a case where the amount of C is more than 0.10%, decarburization is likely to become incomplete, and there is a possibility that magnetic aging may occur in the grain-oriented electrical steel sheet. Therefore, the amount of C is 0.02% or more and 0.10% or less. The amount is preferably 0.05% or more and 0.09% or less.

The amount of silicon (Si) is 2.5% or more and 4.5% or less. Si increases the electrical resistance of the steel sheet, thereby decreasing the eddy-current loss of the grain-oriented electrical steel sheet and decreasing the iron loss. In a case where the amount of Si is less than 2.5%, it becomes difficult to sufficiently suppress the eddy-current loss in the grain-oriented electrical steel sheet. In a case where the amount of Si is more than 4.5%, the workability of the grain-oriented electrical steel sheet degrades. Therefore, the amount of Si is 2.5% or more and 4.5% or less. The amount is preferably 2.7% or more or 4.0% or less.

The amount of manganese (Mn) is 0.01% or more and 0.15% or less. Mn forms MnS, MnSe, and the like that are inhibitors determining secondary recrystallization. In a case where the amount of Mn is less than 0.01%, the absolute amount of MnS and MnSe causing secondary recrystallization lacks, and it is not possible to preferably control orientations. In a case where the amount of Mn is more than 0.15%, the formation of a solid solution of Mn becomes difficult during the heating of the slab, which is not preferable. In addition, in a case where the amount of Mn is more than 0.15%, the precipitation sizes of MnS and MnSe that are inhibitors are likely to coarsen, the optimal size distribution as an inhibitor is impaired, and it is not possible to preferably control the inhibitors. Therefore, the amount of Mn is 0.01% or more and 0.15% or less. The amount is preferably 0.03% or more or 0.13% or less.

The amount of sulfur (S) and selenium (Se) is 0.001% or more and 0.050% or less in total. S and Se form the inhibitors together with Mn. S and Se may be both contained in the slab, but at least one needs to be contained in the slab. In a case where the total of the contents of S and Se is not in the above-described range, a sufficient inhibitor effect cannot be obtained, and it is not possible to preferably control orientations. Therefore, the amount of S and Se is 0.001% or more and 0.050% or less in total. The amount is preferably 0.005% or more or 0.040% or less.

The amount of acid-soluble aluminum (acid-soluble Al) is 0.01% or more and 0.05% or less. The acid-soluble Al forms an inhibitor necessary to manufacture grain-oriented electrical steel sheet having a high magnetic flux density. In a case where the amount of the acid-soluble Al is less than 0.01%, the inhibitor strength lacks, and it is not possible to preferably control orientations. In a case where the amount of the acid-soluble Al is more than 0.05%, AlN precipitated as an inhibitor coarsens, the inhibitor strength decreases, and it is not possible to preferably control orientations. Therefore, the amount of the acid-soluble Al is 0.01% or more and 0.05% or less. The amount is preferably 0.02% or more or 0.04% or less.

The amount of nitrogen (N) is 0.002% or more and 0.015% or less. N forms AlN that is an inhibitor together with the acid-soluble Al. In a case where the amount of N is not in the above-described range, a sufficient inhibitor effect cannot be obtained, and it is not possible to preferably control orientations. Therefore, the amount of N is 0.002% or more and 0.015% or less. The amount is preferably 0.005% or more or 0.012% or less.

The remainder of the slab used to manufacture the grain-oriented electrical steel sheet according to the present embodiment is Fe and an impurity. The slab used to manufacture the grain-oriented electrical steel sheet according to the present embodiment may contain, in addition to the above-described elements, any one or more of Cu, Sn, Ni, Cr, and Sb as an element that stabilizes secondary recrystallization instead of some of Fe which is the remainder. It is not necessary to limit the lower limit value of these selective elements, and the lower limit value may be 0%. The amount of each of these selective elements may be set to 0.01% or more and 0.30% or less. In a case where the amount of even one element among the selective elements is 0.01% or more, it is possible to sufficiently obtain an effect for stabilizing secondary recrystallization, and it is possible to further decrease the iron loss value of the grain-oriented electrical steel sheet. In a case where the amount of even one element among the selective elements is more than 0.30%, the effect for stabilizing secondary recrystallization is saturated, and the manufacturing cost increases, which is not preferable.

The slab is formed by casting molten steel adjusted to the above-described component composition. A method for casting the slab is not particularly limited. The slab may be cast using a casting method, for example, an ordinary continuous casting method, an ordinary ingot method, an ordinary thin slab casting method, or the like. In the case of continuous casting, steel may be once cooled to a low temperature (for example, room temperature), reheated, and then hot-rolled or steel immediately after steel (cast slab) may be continuously hot-rolled. In addition, in research and development, the same effect on the component composition as that in a case where the slab is formed is confirmed even in a case where a steel ingot is formed in a vacuum melting furnace or the like.

Subsequently, the slab is heated to 1,280° C. or higher, thereby forming a solid solution of an inhibitor component in the slab. In a case where the heating temperature of the slab is lower than 1,280° C., it becomes difficult to sufficiently form a solution of the inhibitor component such as MnS, MnSe, and AlN, and it is not possible to preferably control orientations. The upper limit value of the heating temperature of the slab at this time may be set to 1,450° C. or lower from the viewpoint of facility protection.

The heated slab is hot-rolled, thereby obtaining a hot-rolled steel sheet. The sheet thickness of the hot-rolled steel sheet may be, for example, 1.8 mm or more and 3.5 mm or less. In a case where the sheet thickness of the hot-rolled steel sheet is less than 1.8 mm, the steel sheet temperature after hot rolling becomes a low temperature, and the amount of AlN precipitated in the steel sheet increases, whereby there is a case where secondary recrystallization becomes unstable and a magnetic characteristic degrades in a grain-oriented electrical steel sheet that is obtained in the end and has a sheet thickness of 0.23 mm or less. In a case where the sheet thickness of the hot-rolled steel sheet is more than 3.5 mm, there is a case where the rolling load in a cold rolling process increases.

After hot-rolled sheet annealing is carried out on the hot-rolled steel sheet, cold rolling is carried out once or a plurality of times with process annealing therebetween, thereby obtaining a cold-rolled steel sheet. In a case where the hot-rolled steel sheet is rolled by carrying out cold rolling a plurality of times with process annealing therebetween, it is possible to omit the hot-rolled sheet annealing in the previous stage. However, the hot-rolled sheet annealing is capable of making the steel sheet shape more favorable, and thus it is possible to reduce the possibility of the steel sheet being fractured by cold rolling. Therefore, even in a case where the hot-rolled steel sheet is cold-rolled a plurality of times with process annealing therebetween, the hot-rolled sheet annealing is preferably carried out in the previous stage. The conditions for the hot-rolled sheet annealing are not particularly limited and may be ordinary conditions, and the hot-rolled steel sheet after hot rolling needs to be soaked at 750° C. to 1,200° C. for 10 seconds to 10 minutes in the case of continuous annealing and soaked at 650° C. to 950° C. for 30 minutes to 24 hours in the case of box annealing.

Between the passes of cold rolling, between rolling roll stands, or during rolling, a heating treatment may be carried out on the steel sheet at approximately 300° C. or lower. The magnetic characteristic of a grain-oriented electrical steel sheet to be obtained in the end can be further improved by carrying out the heating treatment. The hot-rolled steel sheet may be rolled by carrying out cold rolling three or more times, but carrying out cold rolling multiple times increases the manufacturing cost, and thus the hot-rolled steel sheet is preferably rolled by carrying out cold rolling once or twice.

After the temperature is rapidly increased, decarburization annealing is carried out on the cold-rolled steel sheet. These processes (rapid temperature increase and decarburization annealing) are also referred to as primary recrystallization annealing and preferably continuously carried out. When the primary recrystallization annealing is carried out, in the cold-rolled steel sheet, it is possible to increase Goss orientation grains before secondary recrystallization and decrease the diameters of secondary recrystallized grains after secondary recrystallization.

In the manufacturing method according to the present embodiment, in the temperature increase process for the primary recrystallization annealing, the average temperature increase velocity V in a temperature range of 550° C. to 700° C. is set to 400° C./s or more. When the temperature increase verocity is rapidly increased as described above in the temperature increase process for the primary recrystallization annealing, it is possible to further increase Goss orientation grains before the secondary recrystallization of the cold-rolled steel sheet and decrease the diameters of secondary recrystallized grains after secondary recrystallization.

In a case where the average temperature increase velocity V in a temperature range of 550° C. to 700° C. is set to 700° C./s or more, Goss orientation grains before the secondary recrystallization can be further increased, and thus it is possible to further decrease the iron loss of a grain-oriented electrical steel sheet to be obtained in the end. On the other hand, in a case where the average temperature increase velocity V is set to less than 400° C./s, it becomes difficult to form sufficient Goss orientation grains in order to decrease crystal grain diameters after secondary recrystallization, and the iron loss of a grain-oriented electrical steel sheet to be obtained in the end increases. The upper limit of the average temperature increase velocity V is not particularly limited, but may be set to, for example, 3,000° C./s from the viewpoint of facility and manufacturing costs.

Here, a heat pattern in the temperature increase process for the primary recrystallization annealing will be described with reference to FIG. 1 to FIG. 4. FIG. 1 to FIG. 4 are views showing a specific example of the heat pattern in the temperature increase process for the primary recrystallization annealing.

As shown in FIG. 1, only one temperature increase device 10 configured to increase the temperature of a steel sheet 1 from 550° C. to 700° C. may be provided. In such a case, the average temperature increase velocity V is the average value of temperature increase velocities from a point at which the temperature increase begins (temperature increase begin point A) to a point at which the temperature increase ends (temperature increase end point B) in the temperature increase process (temperature increase device 10) including a temperature increase from 550° C. to 700° C.

Figure 2:
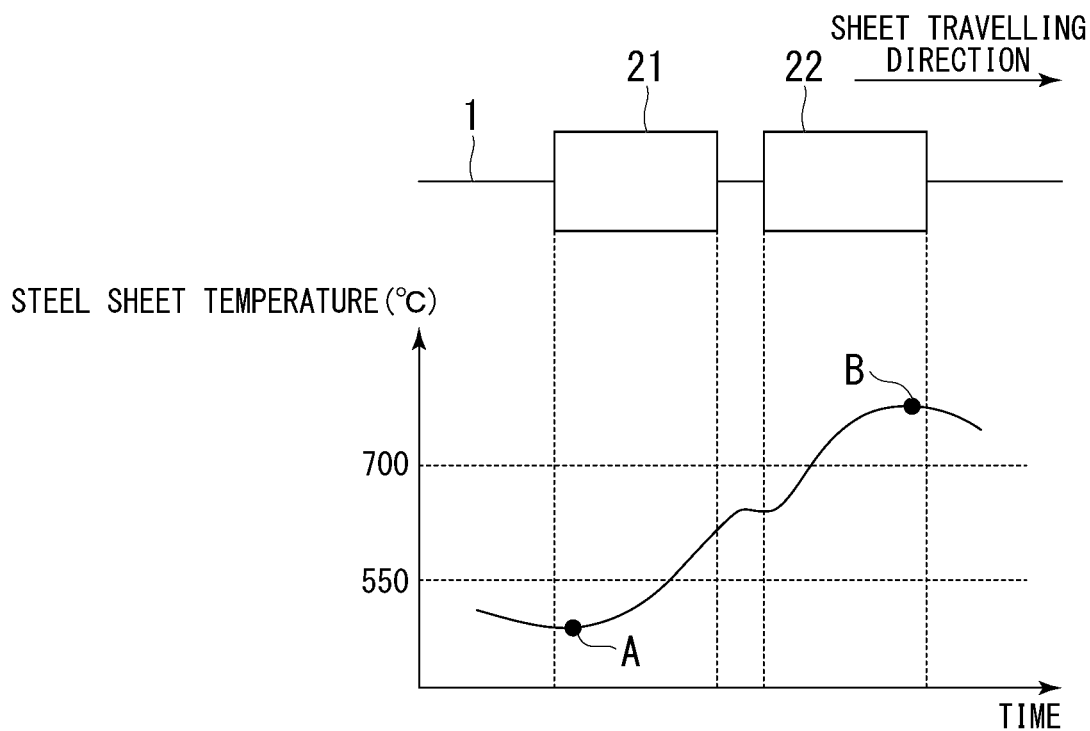
FIG. 2 is a view showing another specific example of the heat pattern in the temperature increase process for primary recrystallization annealing.

As shown in FIG. 2, a plurality of temperature increase devices 21 and 22 configured to increase the temperature of the steel sheet 1 from 550° C. to 700° C. may be provided. In such a case, the average temperature increase velocity V is the average value of temperature increase velocities from a point at which the temperature increase begins (temperature increase begin point A) in the temperature increase process including 550° C. (including a temperature increase from a temperature range of lower than 550° C. to a temperature range of higher than 550° C.) in the temperature increase device 21 to a point at which the temperature increase ends (temperature increase end point B) in the temperature increase process including 700° C. (including a temperature increase from a temperature range of lower than 700° C. to a temperature range of higher than 700° C.) in the temperature increase device 22.

That is, the temperature increase begin point A is a point of transition from a state in which the temperature of the steel sheet 1 has decreased to a state in which the temperature of the steel sheet 1 is about to increase on the low-temperature side of the temperature increase process including 550° C. (that is, a point at which the minimum value lies in the graph of the heat pattern). In addition, the temperature increase end point B is a point of transition from a state in which the temperature of the steel sheet 1 has increased to a state in which the temperature of the steel sheet 1 is about to decrease on the high-temperature side of the temperature increase process including 700° C. (that is, a point at which the maximum value lies in the graph of the heat pattern).

Figure 3:
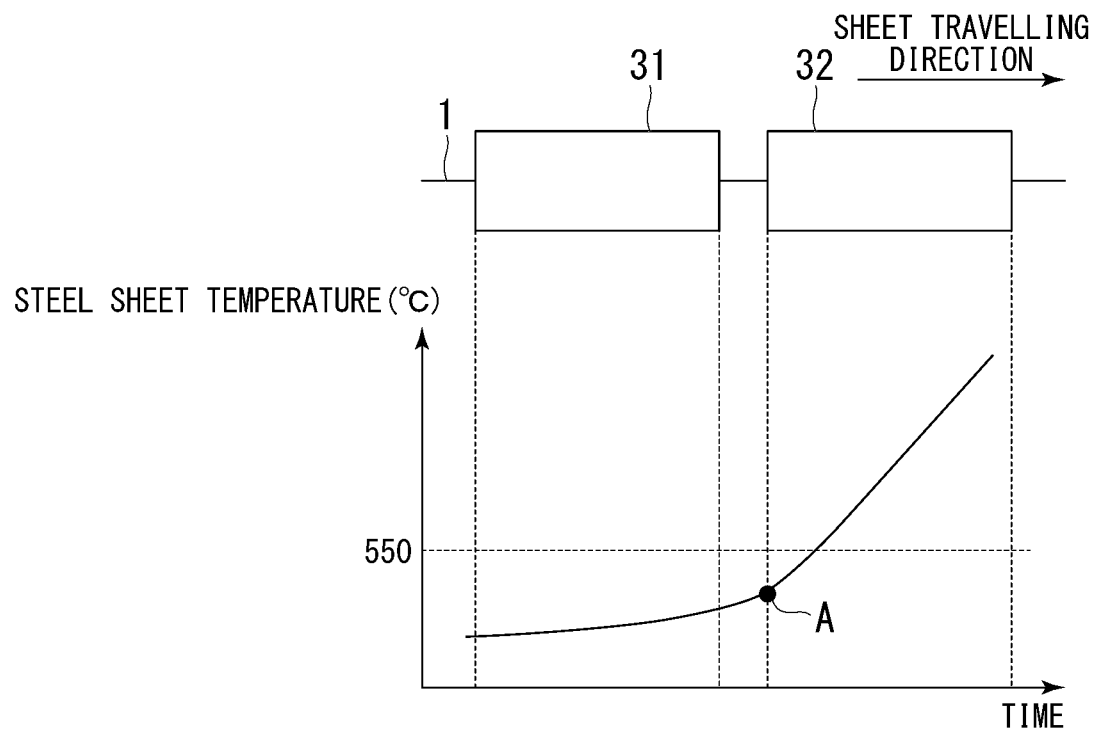
FIG. 3 is a view showing another specific example of the heat pattern in the temperature increase process for primary recrystallization annealing.
Figure 4:
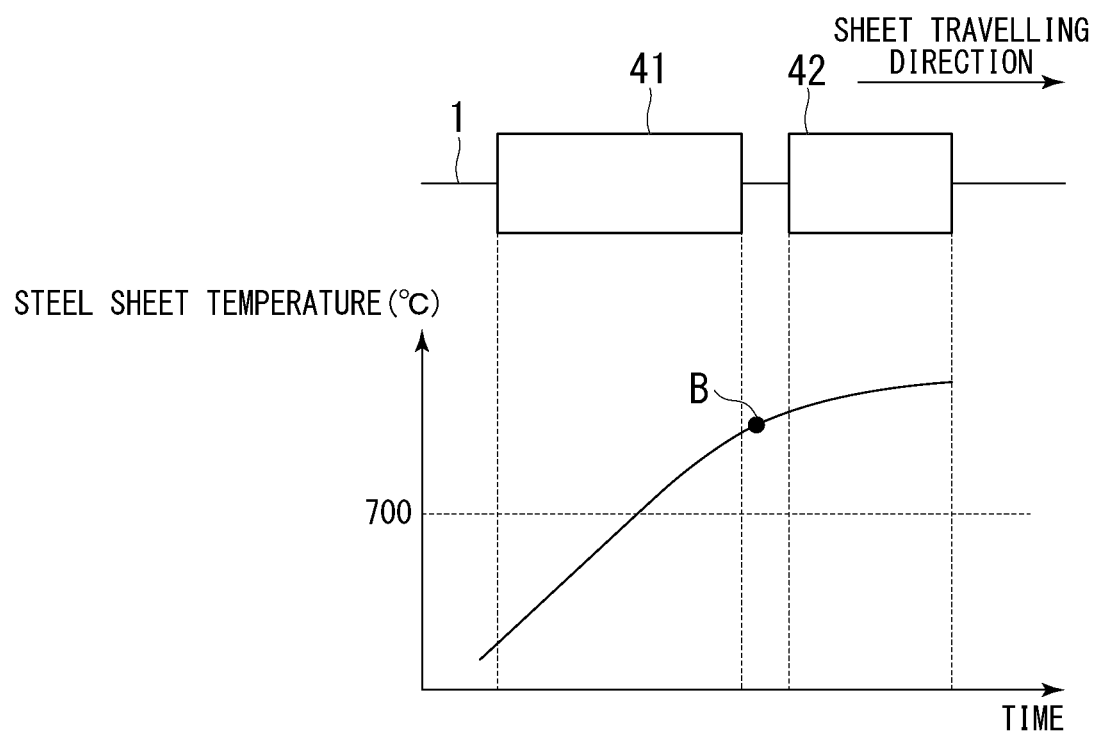
FIG. 4 is a view showing another specific example of the heat pattern in the temperature increase process for primary recrystallization annealing.

However, as shown in FIG. 3, in a case where the temperature of the steel sheet 1 continuously increases due to the disposition of a plurality of temperature increase devices 31 and 32 even on the low-temperature side of the temperature increase process including 550° C., the temperature increase begin point A may be a point at which the change rate of the temperature increase velocity reaches the positive maximum value at 550° C. or lower (point A in FIG. 3). In addition, as shown in FIG. 4, in a case where the temperature of the steel sheet 1 continuously increases due to the disposition of a plurality of temperature increase devices 41 and 42 even on the high-temperature side of the temperature increase process including 700° C., the temperature increase end point B may be a point at which the change rate of the temperature increase velocity reaches the negative minimum value in a temperature range of 700° C. or higher (point B in FIG. 4).

That is, there can be a case where the temperature increase being point A and the temperature increase end point B do not coincide with the inlet and the outlet of the temperature increase device due to the heater configuration, heating performance, disposition, and the like of the temperature increase device.

In the temperature increase process for the primary recrystallization annealing, the heat pattern in a temperature range of 550° C. to 700° C. is not particularly limited, and the heat pattern of the temperature increase devices in the case of providing a plurality of temperature increase devices is also not particularly limited. A temperature increase method or the temperature increase device in the temperature increase process are also not particularly limited, and, for example, an energization heating method or an induction heating method may also be used. In the temperature increase process for the primary recrystallization annealing, the heat pattern in a temperature range other than the temperature range of 550° C. to 700° C. is also not particularly limited, but the temperature of the steel sheet reaching 550° C. or higher before the temperature increase process including the temperature range of 550° C. to 700° C. is not preferred since the effect of the rapid temperature increase in the primary recrystallization annealing detracts.

Here, a method for determining the temperature increase begin point A and the temperature increase end point B is not particularly limited, but the points can be determined by, for example, measuring the steel sheet temperatures outside the temperature increase device and inside the temperature increase device using a radiation-type thermometer or the like. A method for measuring the steel sheet temperature is not particularly limited.

In a case where the measurement of the steel sheet temperature is difficult and the determination of the temperature increase begin point A and the temperature increase end point B is difficult, the temperature increase begin point A and the temperature increase end point B may be estimated by inferring the heat patterns of the temperature increase process and a cooling process each on the basis of the sheet thickness or the like of a steel sheet to be threaded. In addition, furthermore, the temperature increase device inlet side temperature and the temperature increase device outlet side temperature of the steel sheet in the temperature increase process may be regarded as the temperature increase begin point A and the temperature increase end point B.

In the present embodiment, T/L (° C./mm) that is the ratio of the amount of temperature increased T (° C.) to the heated length L (mm) in the temperature increase processes including a rapid temperature increase in the temperature range of 550° C. to 700° C. is controlled to 0.1≤T/L≤4.0. Here, the amount of temperature increased T refers to the amount of temperature increased from the above-described temperature increase begin point A to the temperature increase end point B, and the heated length L refers to the length of the steel sheet being threaded through the temperature increase device from the above-described temperature increase begin point A to the temperature increase end point B. Therefore, in a case where there is a plurality of temperature increase devices, the heated length L also includes the length between the temperature increase devices.

T/L that is the ratio of the amount of temperature increased T to the heated length L indicates the temperature change rate in the longitudinal direction of the steel sheet in the primary recrystallization annealing. Therefore, it is indicated that, as T//L increases, the difference in sheet width caused by thermal expansion between the steel sheet on the low-temperature side and the steel sheet on the high-temperature side increases. It is considered that, in a case where T/L is great, the sheet width of the steel sheet on the high-temperature side significantly shrinks relative to the steel sheet on the low-temperature side, and thus wrinkles are likely to be generated on the surface of the steel sheet. Therefore, it is considered that, as T/L increases, the shape of the grain-oriented electrical steel sheet changes more, and wrinkles on the surface of the grain-oriented electrical steel sheet increase.

The upper limit value of T/L at which the proportion of wrinkles present on the surface of the grain-oriented electrical steel sheet can be suppressed is 4.0° C./mm as is clear from examples described below. T/L is preferably 2.7° C./mm or less.

As the amount of temperature increased T becomes smaller and the heated length L becomes longer, T/L becomes smaller, and thus it becomes possible to obtain a grain-oriented electrical steel sheet including a small number of wrinkles and having a favorable surface shape. However, for T/L, there is a lower limit value from the viewpoint of facility limitation. This is because, in order to improve the magnetic characteristic of the grain-oriented electrical steel sheet by rapidly increasing the temperature in the primary recrystallization annealing, it is important to rapidly increase the temperature at least from 550° C. to 700° C., and there is a limitation in decreasing the amount of temperature increased T. In addition, as the heated length L becomes longer, the installation space of the temperature increase device becomes larger, and it becomes more difficult to increase the threading velocity of the steel sheet. Therefore, the lower limit value of T/L is 0.1° C./mm from the viewpoint of facility limitation. T/L is preferably 0.2° C./mm or more.

The shape of the grain-oriented electrical steel sheet also changes depending on the intensity of the tensile force S (N/mm$^2$) imparted in the sheet travelling direction of the steel sheet (that is, steel sheet tensile force S (N/mm$^2$)) in the temperature increase process for the primary recrystallization annealing. This is considered to be because, in a case where the steel sheet tensile force S is excessively great, the steel sheet thermally expanded at the time of the rapid temperature increase for the primary recrystallization annealing contracts in the width direction, and thus wrinkles are formed on the surface of the grain-oriented electrical steel sheet. Therefore, the upper limit of the steel sheet tensile force S at which wrinkles are not generated on the grain-oriented electrical steel sheet is dependent on the average temperature increase velocity V (° C./s) in the rapid temperature increase. In addition, the intensity of the effect of the rapid temperature increase for increasing Goss orientation grains is also changed depending on the intensity of the steel sheet tensile force S imparted to the steel sheet during the rapid temperature increase for the primary recrystallization annealing. Therefore, the intensity of the tensile force S imparted to the steel sheet during the rapid temperature increase for the primary recrystallization annealing is also affected by the average temperature increase velocity V (° C./s) in the rapid temperature increase.

Specifically, relative to the average temperature increase velocity V (° C./s) in the temperature increase process, the steel sheet tensile force S (N/mm$^2$) is 1.96≤S≤(19.6-1.96× T/L), and the steel sheet tensile force S is 1.96≤S≤(25.5-0.0137×V) in the case of V≤1,000 and is 1.96≤S≤11.8 in the case of V>1,000. The steel sheet tensile force S is the average value of steel sheet tensile forces in the temperature increase process including the rapid temperature increase in a temperature range of 550° C. to 700° C.

In a case where the steel sheet tensile force S exceeds the upper limit value dependent on the average temperature increase velocity V, due to the tensile force imparted in the sheet travelling direction, the shape of a grain-oriented electrical steel sheet to be obtained in the end deteriorates, and wrinkles on the surface increase. In addition, due to the tensile force imparted in the sheet travelling direction of the steel sheet, the texture of crystal grains generated by primary recrystallization is disturbed, and it is not possible to preferably control orientations. On the other hand, in a case where the steel sheet tensile force S is less than 1.96 N/mm$^2$, the steel sheet being threaded meanders and thus there is a possibility that the steel sheet may break or a facility may be damaged.

On the steel sheet having a rapidly increased temperature, decarburization annealing is carried out for 30 seconds to 10 minutes at a temperature of 900° C. or lower in a hydrogen and nitrogen-containing wet atmosphere. In the primary recrystallization annealing made up of the rapid temperature increase and the decarburization annealing, subsequent to the decarburization annealing, reduction annealing may be carried out on the cold-rolled steel sheet for the purpose of improving the magnetic characteristic and coating characteristics. A rapid temperature increase step and a decarburization annealing step may be provided as separate steps, but may be continuously carried out from the viewpoint of omitting a manufacturing step line. In the case of continuously carrying out the rapid temperature increase and the decarburization annealing, the rapid temperature increase step and the decarburization annealing step may be connected to each other using a throat or the like.

An annealing separating agent including MgO as a main component is applied to the cold-rolled steel sheet after the primary recrystallization annealing, and then final annealing is carried out, thereby obtaining a final-annealed sheet. In the final annealing, secondary recrystallization occurs. In addition, the final annealing is carried out after the application of the annealing separating agent, and thus a forsterite coating is formed on the surface of the silicon steel sheet (cold-rolled steel sheet).

The final annealing may be carried out by, for example, holding a coil-shaped cold-rolled steel sheet imparted with the annealing separating agent for 20 hours or longer at a temperature of 800° C. to 1,000° C. using a batch-type heating furnace or the like. Furthermore, in order to further decrease the iron loss value of a grain-oriented electrical steel sheet to be obtained in the end, a purification annealing in which the temperature of the coil-shaped final-annealed sheet is increased up to a temperature of approximately 1,200° C. and then the sheet is held may be carried out.

The average temperature increase velocity in a temperature increase process for the final annealing is not particularly limited and may be a condition for ordinary final annealing. For example, the average temperature increase velocity in the temperature increase process for the final annealing may be set to 5° C./h to 100° C./h from the viewpoint of productivity and general facility limitations. In addition, the temperature increase process for the final annealing may be carried out in a different well-known heat pattern. The atmosphere gas composition in the final annealing is not particularly limited. In a secondary recrystallization process, the atmosphere gas composition may be a gas mixture of nitrogen and hydrogen. The atmosphere may be a dried atmosphere or a wet atmosphere. The atmosphere gas composition of the purification annealing may be a dried hydrogen gas.

After the final annealing, for the purpose of imparting an insulating property and a tensile force to the final-annealed sheet, for example, an insulating coating containing aluminum phosphate, colloidal silica, and the like as main components is applied to the surface of the final-annealed sheet. After that, for the purpose of the baking of the insulating coating and the flattening of the steel sheet shape deformed by the final annealing, flattening annealing is carried out. The flattening annealing may be carried out under well-known conditions and may be carried out by, for example, holding the final-annealed sheet in a temperature range of 800° C. to 950° C. for 10 seconds or longer. The component of the insulating coating is not particularly limited as long as an insulating property and a tensile force are imparted to the final-annealed sheet.

The grain-oriented electrical steel sheet according to the present embodiment can be manufactured using the above-described manufacturing method. The grain-oriented electrical steel sheet according to the present embodiment manufactured using the above-described manufacturing method is as described below.

The grain-oriented electrical steel sheet is a grain-oriented electrical steel sheet having
a silicon steel sheet,
a forsterite coating disposed on the silicon steel sheet, and
an insulating film disposed on the forsterite coating,
in which the silicon steel sheet has a component composition containing, by mass %,
Si: 2.5% or more and 4.5% or less,
Mn: 0.01% or more and 0.15% or less,
S and Se in total: 0% or more and 0.005% or less,
acid-soluble Al: 0% or more and 0.01% or less, and
N: 0% or more and 0.005% or less
with a remainder including Fe and an impurity,
an average grain size of secondary recrystallized grains in the silicon steel sheet is 10 mm or more and 50 mm or less, and
the grain-oriented electrical steel sheet has
a sheet thickness of 0.15 mm or more and 0.23 mm or less,
an iron loss Wp of 0.800 W/kg or less in terms of $W_{17/50}$,
a presence proportion of a wrinkle of 0 winkles/m or more and 10 wrinkles/m or less, the wrinkle having a steepness of 0.01 or more, in a sheet width direction, and
a magnetic flux density B8 value of 1.930 T or more.

In the grain-oriented electrical steel sheet according to the present embodiment, in order to decrease the iron loss even without carrying out a magnetic domain refinement treatment, it is important to control the contents of, among the component composition contained in the silicon steel sheet of the grain-oriented electrical steel sheet, Si and Mn.

Si increases the electrical resistance of the steel sheet, thereby decreasing the eddy-current loss configuring a part of the iron loss. The amount of Si contained in the silicon steel sheet is desirably in a range of 2.5% or more and 4.5% or less by mass %. The amount is preferably 2.7% or more or 4.0% or less. In a case where the amount of Si is less than 2.5%, it becomes difficult to suppress the eddy-current loss in the grain-oriented electrical steel sheet. In a case where the amount of Si is more than 4.5%, the workability of the grain-oriented electrical steel sheet degrades.

Mn forms MnS or MnSe that is an inhibitor determining secondary recrystallization. The amount of Mn contained in the silicon steel sheet is desirably in a range of 0.01% or more and 0.15% or less by mass %. The amount is preferably 0.03% or more or 0.13% or less. In a case where the amount of Mn is less than 0.01%, the absolute amount of MnS and MnSe causing secondary recrystallization lacks, and it is not possible to preferably control orientations. In a case where the amount of Mn is more than 0.15%, the formation of a solid solution of Mn becomes difficult during the heating of the slab, and the precipitation size of the inhibitor coarsens, and thus the optimal size distribution of the inhibitor is impaired, and it is not possible to preferably control the inhibitors.

The remainder of the silicon steel sheet according to the present embodiment is Fe and an impurity. The silicon steel sheet may contain, instead of some of Fe which is the remainder, C, S, Se, acid-soluble Al, and N, and, as an element that stabilizes secondary recrystallization, any one or more of Cu, Sn, Ni, Cr, and Sb. It is not necessary to limit the lower limit value of these selective elements, and the lower limit value may be 0%.

The amount of C is preferably small, but may be set to 0.0050% or less. In a case where the amount of C is more than 0.0050% even after the decarburization annealing is carried out, there is a case where magnetic aging is caused and the magnetic characteristic of the grain-oriented electrical steel sheet degrades.

The contents of S and Se are preferably small, but may be set to 0.005% or less in total. In a case where the contents of S and Se are more than 0.005% in total, there is a case where magnetic aging is caused and the magnetic characteristic degrades.

The amount of N is preferably small, but may be set to 0.010% or less. In a case where the amount of N is more than 0.010%, there is a case where magnetic aging is caused and the magnetic characteristic degrades. More preferably, the amount may be set to 0.005% or less.

The amount of the acid-soluble Al is preferably small, but may be set to 0.01% or less. In a case where the amount of the acid-soluble Al is more than 0.01%, there is a case where magnetic aging is caused and the magnetic characteristic degrades.

The amount of each of Cu, Sn, Ni, Cr, and Sb may be 0.01% or more and 0.30% or less. In a case where the amount of even one element among these elements is 0.01% or more, an effect for stabilizing secondary recrystallization is sufficiently obtained, and it is possible to further decrease the iron loss value and obtain a more favorable magnetic characteristic. In a case where the amount of even one element among these elements is more than 0.30%, the effect for stabilizing secondary recrystallization is saturated, which is not preferable from the viewpoint of suppressing an increase in the manufacturing cost of the grain-oriented electrical steel sheet.

The component composition of the silicon steel sheet may be measured from a silicon steel sheet obtained by removing the insulating coating and the forsterite coating of the grain-oriented electrical steel sheet using inductively coupled plasma-atomic emission spectrometry (ICP-AES). C and S may be measured using an infrared absorption method after combustion, and N may be measured using an inert gas melting-thermal conductivity method.

A method for removing the insulating coating and the forsterite coating of the grain-oriented electrical steel sheet is specifically as described below. The insulating coating and the forsterite coating of the grain-oriented electrical steel sheet are removed, thereby obtaining a silicon steel sheet. Specifically, the grain-oriented electrical steel sheet is immersed in a sodium hydroxide aqueous solution of 20% by mass of NaOH and 80% by mass of $H_2O$ at 80° C. for 20 minutes, then, washed with water and dried, thereby removing the insulating coating of the grain-oriented electrical steel sheet. Subsequently, the grain-oriented electrical steel sheet is immersed in a hydrochloric acid aqueous solution of 20% by mass of HCl and 80% by mass of $H_2O$ at 50° C. for two minutes, then, washed with water and dried, thereby removing the forsterite coating of the grain-oriented electrical steel sheet and obtaining a silicon steel sheet. The time during which the grain-oriented electrical steel sheet is immersed in the sodium hydroxide aqueous solution or the hydrochloric aqueous solution may be changed depending on the thickness of the coating.

In the silicon steel sheet according to the present embodiment, the average grain size of secondary recrystallized grains is controlled. In the silicon steel sheet according to the present embodiment, the average grain size of the secondary recrystallized grains is 10 mm or more and 50 mm or less. The average grain size is preferably 40 mm or less.

In a case where the average grain size of the secondary recrystallized grains is more than 50 mm, the iron loss value (particularly, the eddy-current loss) of the grain-oriented electrical steel sheet becomes great. The lower limit value of the average grain size of the secondary recrystallized grains may be set to, for example, 10 mm in order to satisfy the magnetic characteristic of the grain-oriented electrical steel sheet according to the present embodiment.

The average grain size of the secondary recrystallized grains in the silicon steel sheet can be measured using, for example, the following method.

The insulating coating and the forsterite coating of the grain-oriented electrical steel sheet are removed using the same method as the above-described method. While the obtained silicon steel sheet is immersed in the hydrochloric acid aqueous solution, a pit shape is formed in accordance with crystal orientations on the surface of the steel sheet, and thus the steel structure of the silicon steel sheet can be observed. A test piece is cut out such that an observation surface reaches at least 60 mm in width and 300 mm in length, the steel structure of the silicon steel sheet is observed, and grain boundaries between macroscopically observable crystal grains are traced using an oil-based pen. At least five images of the surface of the grain-oriented electrical steel sheet are acquired using a commercially available image scanner, and the acquired images are analyzed using commercially available image analysis software. The equivalent circle diameters of crystal grains of the grain-oriented electrical steel sheet in all of the images are measured by an image analysis, and then the average value of the measured equivalent circle diameters is computed, thereby obtaining the average grain size of the secondary recrystallized grains in the grain-oriented electrical steel sheet.

For small crystal grains that have a grain diameter of, for example, less than 2 mm and are thus not easily visually specified, the grain diameters of the secondary recrystallized grains are not measured.

The forsterite coating disposed on the silicon steel sheet contains $Mg_2SiO_4$ as a main component and includes a small amount of an impurity or an additive included in the silicon steel sheet or the annealing separating agent and a reaction product thereof.

The insulating film disposed on the forsterite coating contains phosphate and colloidal silica as main elements and includes a small amount of an element or an impurity diffused from the silicon steel sheet during the purification annealing and a reaction product thereof. The component may be different as long as an insulating property and a tensile force imparted to the steel sheet can be obtained.

The sheet thickness of the grain-oriented electrical steel sheet of the present embodiment is 0.15 mm or more and 0.23 mm or less. In a case where the sheet thickness of the grain-oriented electrical steel sheet is less than 0.15 mm, the load of the cold rolling significantly increases. In a case where the sheet thickness of the grain-oriented electrical steel sheet is more than 0.23 mm, the iron loss of the grain-oriented electrical steel sheet deteriorates.

The sheet thickness of the grain-oriented electrical steel sheet may be measured and obtained using radioactive rays or the like. Simply, the sheet thickness may be converted and computed from the weight of the steel sheet using the density of iron after collecting a sample having a predetermined size by shearing from the grain-oriented electrical steel sheet. In addition, the sheet thickness may be converted and obtained from the coil diameter and the number of turns of the steel sheet. The density of iron is preferably selected depending on the amount of Si contained.

A magnetic flux density B8 value of the grain-oriented electrical steel sheet is set to 1.930 T or more. Here, the magnetic flux density B8 value refers to the average value of magnetic flux densities when a magnetic field of 800 A/m is imparted.

In a case where the magnetic flux density B8 value is less than 1.930 T, the iron loss value (particularly, hysteresis loss) of the grain-oriented electrical steel sheet becomes great. The upper limit value of the magnetic flux density B8 value is not particularly limited; however, realistically, may be set to, for example, 2.000 T. The magnetic characteristic of the grain-oriented electrical steel sheet such as the magnetic flux density can be measured using a well-known method. For example, the magnetic characteristic of the grain-oriented electrical steel sheet can be measured using a method based on an Epstein frame regulated by JIS C 2550:2011, a single sheet tester (SST) regulated by JIS C 2556:2015, or the like; however, in the present embodiment, the magnetic characteristic is obtained using the method based on the Epstein frame regulated by JIS C 2550:2011. In the measurement of the magnetic flux density B8 value, a set of samples are collected from both end portions of a coil of the grain-oriented electrical steel sheet after the final step in the longitudinal direction respectively, and the average value of the magnetic flux density B8 values obtained using the samples is obtained. After the coil is divided in the longitudinal direction, a set of the samples may be collected from both end portions of the divided coil in the longitudinal direction respectively. Furthermore, at the time of collecting the samples, in a case where a sufficient length cannot be obtained in the longitudinal direction of the coil and only one sample can be collected, the measurement value from one sample may be used.

In the grain-oriented electrical steel sheet of the present embodiment, the presence proportion of wrinkles having a steepness of 0.01 or more is 0 wrinkles/m or more and 10 wrinkles/m or less in the sheet width direction. The grain-oriented electrical steel sheet manufactured using the manufacturing method of the present embodiment has a favorable surface shape, and thus it is possible to decrease the presence proportion of wrinkles having a steepness of 0.01 or more which decrease the stacking factor of a core material in the case of stacking the grain-oriented electrical steel sheets.

Figure 5:
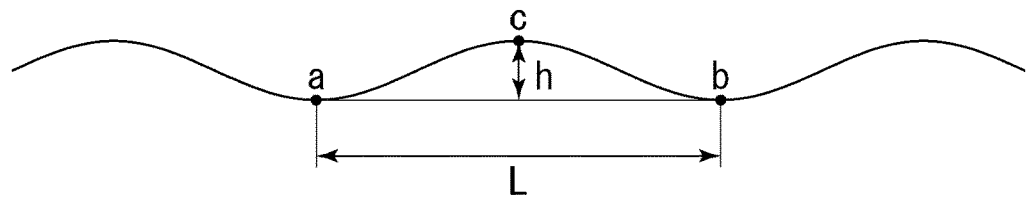
FIG. 5 is a view showing a cross-sectional curve of a grain-oriented electrical steel sheet that is intended to describe a method for obtaining a steepness.

A method for obtaining the steepness will be described with reference to FIG. 5. FIG. 5 is a view showing a cross-sectional curve (waviness curve) of the grain-oriented electrical steel sheet that is obtained by measuring the surface of the grain-oriented electrical steel sheet using a laser displacement meter.

The steepness is computed by measuring the shape of a protrusion portion present on the surface of the grain-oriented electrical steel sheet. First, the shape of the steel sheet in the sheet width direction is measured using a laser displacement meter, thereby obtaining a cross-sectional curve of the grain-oriented electrical steel sheet in the sheet width direction as shown in FIG. 5. In a case where a noise of the cross-sectional curve is large, the noise may be removed as long as the measured cross-sectional curve does not significantly deviate. From this cross-sectional curve, a protrusion portion having a peak height h of 0.1 mm or more is extracted. The peak height h extracted as the protrusion portion is more preferably 0.05 mm or more. The peak height h is the distance between a straight line connecting two lowest points (point a and point b in FIG. 5) in the vicinity of the protrusion portion and the height point (point c in FIG. 5) of the protrusion portion. The peak height h of the extracted protrusion portion is divided by ½ of a length L of the straight line connecting the two lowest points (point a and point b in FIG. 5) in the vicinity of the extracted protrusion portion, thereby obtaining the steepness of the extracted protrusion portion (that is, steepness=2 h/L). In the present embodiment, a protrusion portion having a steepness obtained using the above-described method of 0.01 or more is regarded as a wrinkle, and the number of wrinkles having a steepness of 0.01 or more present in one meter of the grain-oriented electrical steel sheet in the sheet width direction is obtained. By obtaining a cross-sectional curve, with a total length 4 m in the sheet width direction, from at least four or more places in the grain-oriented electrical steel sheet, the number of wrinkles is obtained using the above-described method.

As described above, the grain-oriented electrical steel sheet according to the present embodiment is capable of decreasing the iron loss value without carrying out a magnetic domain refinement. Specifically, in the grain-oriented electrical steel sheet according to the present embodiment, an iron loss Wp in the case of not carrying out a magnetic domain refinement treatment is 0.800 W/kg or less in terms of $W_{17/50}$. The iron loss is preferably 0.790 W/kg or less and more preferably 0.785 W/kg or less. The lower limit does not need to be particularly limited, but may be set to 0.600 W/kg from the viewpoint of industrial stable manufacturability. Here, as the iron loss Wp in the case of not carrying out a magnetic domain refinement treatment, a value measured from the grain-oriented electrical steel sheet after stress relief annealing is used. $W_{17/50}$ refers to the average value of iron losses when the grain-oriented electrical steel sheet is excited to 1.7 T at 50 Hz. In the measurement of the iron loss Wp, samples are collected from both end portions of a coil of the grain-oriented electrical steel sheet after the final step in the longitudinal direction respectively, and the average value of the iron losses obtained using the samples is obtained. After the coil is divided in the longitudinal direction, the samples may be collected from both end portions of the divided coil in the longitudinal direction respectively. Furthermore, at the time of collecting the samples, in a case where a sufficient length cannot be obtained in the longitudinal direction of the coil and only one sample can be collected, the measurement value from one set of samples may be used.

As described above, the grain-oriented electrical steel sheet according to the present embodiment is capable of sufficiently decreasing the iron loss even without carrying out a magnetic domain refinement. The magnetic domain refinement treatment is capable of decreasing the iron loss value of the grain-oriented electrical steel sheet, but increases a noise in transformers in which the grain-oriented electrical steel sheet is used for a core material. Therefore, the grain-oriented electrical steel sheet according to the present embodiment is capable of satisfying both the magnetic characteristic of a transformer and a noise characteristic.

According to the method for manufacturing a grain-oriented electrical steel sheet according to the present embodiment, it is possible to manufacture a grain-oriented electrical steel sheet having an iron loss sufficiently decreased even without carrying out a magnetic domain refinement treatment and a favorable surface shape. The grain-oriented electrical steel sheet according to the present embodiment manufactured using the above-described manufacturing method has a favorable surface shape and is thus capable of improving the stacking factor in the case of being used as a core material for transformers. It is needless to say that, in the present embodiment, a magnetic domain refinement treatment may be carried out on the grain-oriented electrical steel sheet depending on customers' purposes.

EXAMPLES

Hereinafter, a method for manufacturing a grain-oriented electrical steel sheet and a grain-oriented electrical steel sheet according to the present embodiment will be more specifically described while describing examples. In the examples described below, the grain-oriented electrical steel sheet according to the present embodiment is simply an example, and the grain-oriented electrical steel sheet according to the present embodiment is not limited to the examples described below.

Example 1

A slab containing, by mass %, C: 0.08%, Si: 3.3%, Mn: 0.08%, S: 0.024%, acid-soluble Al: 0.03%, and N: 0.008% with a remainder including Fe and an impurity was produced. The slab was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled, and then cold-rolled, thereby obtaining a cold-rolled steel sheet having a sheet thickness of 0.23 mm.

Subsequently, the temperature of the obtained cold-rolled steel sheet was rapidly increased at an average temperature increase velocity V (° C./s) shown in Table 1 and Table 2 while imparting a steel sheet tensile force S (N/mm$^2$) shown in Table 1 and Table 2 to the cold-rolled steel sheet. At this time, as the average temperature increase velocity V (° C./s), the average value of temperature increase velocities in a temperature range of 550° C. to 700° C. was used, and, in addition, an amount of temperature increased T (° C.) and a heated length L (mm) were changed as shown in Table 1 and Table 2 by changing the temperature increase outputs of temperature increase devices and the distance between the temperature increase devices, switching the temperature increase devices, or the like. Here, the temperature increase device inlet side temperature in a temperature increase process including 550° C. was regarded as a temperature increase begin point A, the temperature increase device outlet side temperature in a temperature increase process including 700° C. was regarded as a temperature increase begin point B, and the average from the temperature increase begin point A to the temperature increase end point B was regarded as the average temperature increase velocity V (° C./s). After that, decarburization annealing was carried out at 850° C. for 180 seconds in a wet hydrogen-nitrogen atmosphere.

Next, an annealing separating agent including MgO was applied to the surface of the cold-rolled steel sheet after primary recrystallization annealing, then, final annealing was carried out to obtain final annealing, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less.

Specimens for an Epstein frame were collected by shearing from both end portions of a coil of the grain-oriented electrical steel sheet obtained using the above-described method in the sheet width direction respectively, stress relief annealing was carried out on these specimens, and then an iron loss Wp and a magnetic flux density B8 value were measured according to the Epstein frame regulated by JIS C 2550:2011. The iron loss Wp was measured in term of $W_{17/50}$, and the average value of iron losses obtained by exciting the grain-oriented electrical steel sheet to 1.7 T at 50 Hz was used. As the magnetic flux density B8 value, the average value of the magnetic flux densities obtained by imparting a magnetic field of 800 A/m at 50 Hz was used.

In addition, two specimens were collected by shearing from each of both end portions of the coil of the grain-oriented electrical steel sheet in the sheet width direction, and the surface shapes in the sheet width direction were measured using a laser displacement meter, thereby obtaining a cross-sectional curve. The number of wrinkles having a steepness of 0.01 or more present per meter in the sheet width direction of the grain-oriented electrical steel sheet was obtained using the obtained cross-sectional curve and the above-described method.

Furthermore, the insulating coating and the forsterite coating of the obtained grain-oriented electrical steel sheet were removed using the above-described method, and then the component composition of the silicon steel sheet was measured using ICP-AES. Furthermore, the average grain size of secondary recrystallized grains in the silicon steel sheet was measured using the above-described method.

In a case where the iron loss Wp was 0.800 or less and the presence proportion of the wrinkles was 0 winkles/m or more and 10 wrinkles/m or less, the grain-oriented electrical steel sheet was determined as pass. In the case of failing to satisfy any one of these conditions, the grain-oriented electrical steel sheet was determined as fail and expressed as "C" in the evaluation column in tables. The iron losses Wp of examples determined as pass were evaluated on the basis of the following standards.

S (Extremely favorable): 0.785 W/kg or less
A (More favorable): Wp was more than 0.785 W/kg and 0.790 W/kg or less
B (Favorable): Wp was more than 0.790 W/kg and 0.800 W/kg or less The manufacturing conditions, measurement results, and evaluation results of the grain-oriented electrical steel sheets are shown in Table 1 and Table 2. For invention examples, in the component composition of the silicon steel sheet, the total amount of S and Se was 0.005% or less, the amount of acid-soluble Al was 0.01% or less, the amount of N was 0.005% or less, and the remainder was Fe and an impurity.

TABLE 1

| | Primary recrystallization annealing | | | | | |
|---|---|---|---|---|---|---|
| Condition | Temperature increase velocity V (° C./s) | Steel sheet tensile force S (N/mm$^2$) | Amount of temperature increased T (° C.) | Heated length L (mm) | T/L (° C./mm) | Presence proportion of wrinkles (wrinkles/m) |
| A1  | 100  | 7.84  | 250 | 150  | 1.7 | 6 |
| A2  | 400  | 7.84  | 250 | 150  | 1.7 | 6 |
| A3  | 700  | 7.84  | 250 | 150  | 1.7 | 6 |
| A4  | 1000 | 7.84  | 250 | 150  | 1.7 | 6 |
| A5  | 1500 | 7.84  | 250 | 150  | 1.7 | 6 |
| A6  | 2500 | 7.84  | 250 | 150  | 1.7 | 6 |
| A7  | 1000 | 7.84  | 250 | 150  | 1.7 | 7 |
| A8  | 1000 | 7.84  | 400 | 150  | 2.7 | 8 |
| A9  | 1000 | 7.84  | 600 | 150  | 4.0 | 10 |
| A10 | 1000 | 7.84  | 700 | 150  | 4.7 | 12 |
| A11 | 1000 | 7.84  | 850 | 150  | 5.7 | 15 |
| A12 | 400  | 1.96  | 250 | 1000 | 0.3 | 3 |
| A13 | 400  | 11.76 | 250 | 1000 | 0.3 | 7 |
| A14 | 400  | 15.90 | 250 | 1000 | 0.3 | 8 |
| A15 | 400  | 17.64 | 250 | 1000 | 0.3 | 9 |
| A16 | 400  | 21.56 | 250 | 1000 | 0.3 | 12 |
| A17 | 700  | 1.96  | 400 | 400  | 1.0 | 3 |
| A18 | 700  | 11.76 | 400 | 400  | 1.0 | 8 |
| A19 | 700  | 15.90 | 400 | 400  | 1.0 | 9 |
| A20 | 700  | 17.64 | 400 | 400  | 1.0 | 10 |
| A21 | 700  | 21.56 | 400 | 400  | 1.0 | 11 |
| A22 | 1000 | 1.96  | 250 | 150  | 1.7 | 4 |

| | Silicon steel sheet | | | | | | |
|---|---|---|---|---|---|---|---|
| Condition | Iron loss Wp (W/kg) | Magnetic flux density B8 value (T) | Average grain size of secondary recrystallized grains (mm) | Si (%) | Mn (%) | Evaluation | Note |
| A1  | 0.844 | 1.934 | 55 | 3.2 | 0.08 | C | Comparative Example |
| A2  | 0.797 | 1.934 | 44 | 3.2 | 0.08 | B | Invention Example |
| A3  | 0.789 | 1.934 | 35 | 3.2 | 0.08 | A | Invention Example |
| A4  | 0.785 | 1.935 | 27 | 3.2 | 0.08 | S | Invention Example |
| A5  | 0.784 | 1.936 | 25 | 3.2 | 0.08 | S | Invention Example |
| A6  | 0.777 | 1.936 | 22 | 3.2 | 0.08 | S | Invention Example |
| A7  | 0.784 | 1.935 | 27 | 3.2 | 0.08 | S | Invention Example |
| A8  | 0.785 | 1.935 | 27 | 3.2 | 0.08 | S | Invention Example |
| A9  | 0.784 | 1.935 | 27 | 3.2 | 0.08 | S | Invention Example |
| A10 | 0.785 | 1.935 | 26 | 3.2 | 0.08 | C | Comparative Example |
| A11 | 0.785 | 1.935 | 25 | 3.2 | 0.08 | C | Comparative Example |
| A12 | 0.800 | 1.934 | 46 | 3.2 | 0.08 | B | Invention Example |
| A13 | 0.798 | 1.934 | 43 | 3.2 | 0.08 | B | Invention Example |
| A14 | 0.799 | 1.934 | 42 | 3.2 | 0.08 | B | Invention Example |
| A15 | 0.799 | 1.933 | 41 | 3.2 | 0.08 | B | Invention Example |
| A16 | 0.806 | 1.929 | 41 | 3.2 | 0.08 | C | Comparative Example |
| A17 | 0.788 | 1.934 | 36 | 3.2 | 0.08 | A | Invention Example |
| A18 | 0.788 | 1.934 | 33 | 3.2 | 0.08 | A | Invention Example |
| A19 | 0.789 | 1.932 | 32 | 3.2 | 0.08 | A | Invention Example |
| A20 | 0.804 | 1.929 | 29 | 3.2 | 0.08 | C | Comparative Example |

TABLE 1-continued

| | | | | | | | |
|---|---|---|---|---|---|---|---|
| A21 | 0.820 | 1.927 | 27 | 3.2 | 0.08 | C | Comparative Example |
| A22 | 0.784 | 1.936 | 28 | 3.2 | 0.08 | S | Invention Example |

TABLE 2

| | Primary recrystallization annealing | | | | | |
|---|---|---|---|---|---|---|
| Condition | Temperature increase velocity V (° C./s) | Steel sheet tensile force S (N/mm²) | Amount of temperature increased T (° C.) | Heated length L (mm) | T/L (° C./mm) | Presence proportion of wrinkles (wrinkles/m) |
| A23 | 1000 | 11.76 | 250 | 150 | 1.7 | 8 |
| A24 | 1000 | 15.90 | 250 | 150 | 1.7 | 10 |
| A25 | 1000 | 17.64 | 250 | 150 | 1.7 | 12 |
| A26 | 1000 | 21.56 | 250 | 150 | 1.7 | 15 |
| A27 | 1500 | 1.96 | 400 | 150 | 2.7 | 8 |
| A28 | 1500 | 11.76 | 400 | 150 | 2.7 | 8 |
| A29 | 1500 | 15.90 | 400 | 150 | 2.7 | 11 |
| A30 | 1500 | 17.64 | 400 | 150 | 2.7 | 12 |
| A31 | 1500 | 21.56 | 400 | 150 | 2.7 | 15 |
| A32 | 2500 | 1.96 | 600 | 150 | 4.0 | 5 |
| A33 | 2500 | 11.76 | 600 | 150 | 4.0 | 10 |
| A34 | 2500 | 15.90 | 600 | 150 | 4.0 | 12 |
| A35 | 2500 | 17.64 | 600 | 150 | 4.0 | 14 |
| A36 | 2500 | 21.56 | 600 | 150 | 4.0 | 18 |
| A37 | 700 | 15.90 | 250 | 150 | 1.7 | 10 |
| A38 | 700 | 15.90 | 600 | 150 | 4.0 | 13 |
| A39 | 700 | 15.90 | 700 | 150 | 4.7 | 14 |
| A40 | 700 | 15.90 | 850 | 150 | 5.7 | 15 |
| A41 | 700 | 15.90 | 250 | 400 | 0.6 | 9 |
| A42 | 700 | 15.90 | 400 | 400 | 1.0 | 9 |
| A43 | 700 | 15.90 | 600 | 400 | 1.5 | 10 |
| A44 | 700 | 15.90 | 850 | 400 | 2.1 | 11 |

| | Silicon steel sheet | | | | | | |
|---|---|---|---|---|---|---|---|
| Condition | Iron loss Wp (W/kg) | Magnetic flux density B8 value (T) | Average grain size of secondary recrystallized grains (mm) | Si (%) | Mn (%) | Evaluation | Note |
| A23 | 0.784 | 1.936 | 26 | 3.2 | 0.08 | S | Invention Example |
| A24 | 0.810 | 1.928 | 23 | 3.2 | 0.08 | C | Comparative Example |
| A25 | 0.828 | 1.925 | 23 | 3.2 | 0.08 | C | Comparative Example |
| A26 | 0.844 | 1.921 | 22 | 3.2 | 0.08 | C | Comparative Example |
| A27 | 0.784 | 1.936 | 25 | 3.2 | 0.08 | S | Invention Example |
| A28 | 0.784 | 1.936 | 24 | 3.2 | 0.08 | S | Invention Example |
| A29 | 0.815 | 1.927 | 21 | 3.2 | 0.08 | C | Comparative Example |
| A30 | 0.830 | 1.922 | 20 | 3.2 | 0.08 | C | Comparative Example |
| A31 | 0.856 | 1.920 | 19 | 3.2 | 0.08 | C | Comparative Example |
| A32 | 0.777 | 1.936 | 22 | 3.2 | 0.08 | S | Invention Example |
| A33 | 0.777 | 1.936 | 21 | 3.2 | 0.08 | S | Invention Example |
| A34 | 0.818 | 1.926 | 18 | 3.2 | 0.08 | C | Comparative Example |
| A35 | 0.832 | 1.921 | 18 | 3.2 | 0.08 | C | Comparative Example |
| A36 | 0.863 | 1.919 | 17 | 3.2 | 0.08 | C | Comparative Example |
| A37 | 0.789 | 1.932 | 32 | 3.2 | 0.08 | A | Invention Example |

TABLE 2-continued

| | | | | | | | |
|---|---|---|---|---|---|---|---|
| A38 | 0.789 | 1.932 | 31 | 3.2 | 0.08 | C | Comparative Example |
| A39 | 0.789 | 1.932 | 31 | 3.2 | 0.08 | C | Comparative Example |
| A40 | 0.790 | 1.932 | 30 | 3.2 | 0.08 | C | Comparative Example |
| A41 | 0.788 | 1.932 | 32 | 3.2 | 0.08 | A | Invention Example |
| A42 | 0.789 | 1.932 | 32 | 3.2 | 0.08 | A | Invention Example |
| A43 | 0.790 | 1.932 | 32 | 3.2 | 0.08 | A | Invention Example |
| A44 | 0.790 | 1.932 | 31 | 3.2 | 0.08 | C | Comparative Example |

When the results in Table 1 and Table 2 are referred to, it was found that the grain-oriented electrical steel sheets satisfying the conditions of the present embodiment (invention examples) were evaluated as B or higher (favorable or higher). In addition, in invention examples in which the average temperature increase velocity V in a temperature range of 550° C. to 700° C. in the primary recrystallization annealing was 700° C./s or more, it was found that the iron loss Wp reached 0.790 W/kg or less, and the evaluation was A or higher (more favorable or higher). Furthermore, in invention examples in which the average temperature increase velocity V in a temperature range of 550° C. to 700° C. in the primary recrystallization annealing was 1,000° C./s or more, it was found that the iron loss Wp reached 0.785 W/kg or less, and the evaluation was S (Extremely favorable).

Figure 6:
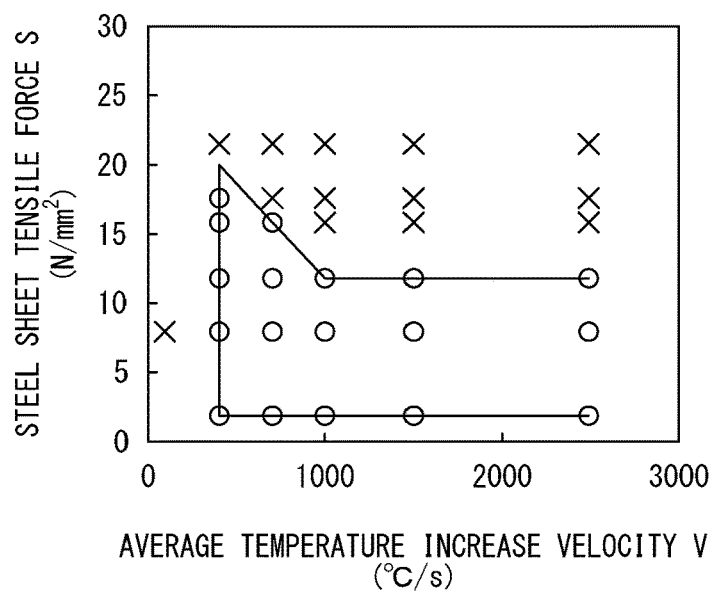
FIG. 6 is a view obtained by indicating a temperature increase velocity V along a horizontal axis, indicating a steel sheet tensile force S along a vertical axis, and plotting results shown in Table 1.
Figure 7:
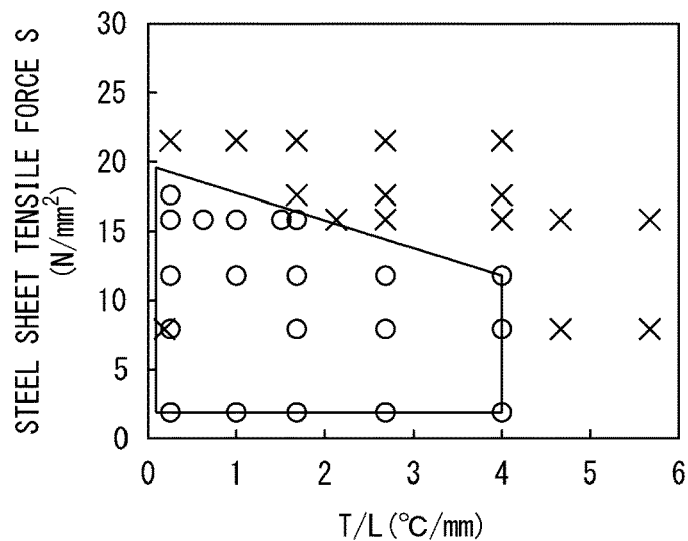
FIG. 7 is a view obtained by indicating a ratio T/L along the horizontal axis, indicating the steel sheet tensile force S along the vertical axis, and plotting the results shown in Table 1.

A graph obtained by indicating the temperature increase velocity V along the horizontal axis, indicating the steel sheet tensile force S along the vertical axis, and plotting the results shown in Table 1 and Table 2 is shown in FIG. 6. In addition, a graph obtained by indicating T/L along the horizontal axis, indicating the steel sheet tensile force S along the vertical axis, and plotting the results shown in Table 1 and Table 2 is shown in FIG. 7. In FIG. 6 and FIG. 7, the invention examples are plotted as round signs, and comparative examples are plotted as multiplication signs.

As shown in FIG. 6, it is found that, between the temperature increase velocity V (° C./s) in the temperature increase process for primary recrystallization annealing and the steel sheet tensile force S (N/mm$^2$), as regulated by the manufacturing method according to the present embodiment, the relationships of Expression 1 and Expression 2 need to be satisfied. Therefore, according to the manufacturing method according to the present embodiment, it is possible to manufacture a grain-oriented electrical steel sheet having decreased iron loss value.

$$1.96 \leq S \leq (25.5 - 0.0137 \times V)(V \leq 1,000) \quad \text{Expression 1}$$

$$1.96 \leq S \leq 11.8 (V > 1,000) \quad \text{Expression 2}$$

In addition, as shown in FIG. 7, it is found that, as regulated by the manufacturing method according to the present embodiment, the number of wrinkles on the grain-oriented electrical steel sheet can be decreased by regulating the steel sheet tensile force S (N/mm$^2$) in the temperature increase process for primary recrystallization annealing and T/L (° C./mm) like Expression 3 and Expression 4.

$$0.1 \leq T/L \leq 4.0 \quad \text{Expression 3}$$

$$1.96 \leq S \leq (19.6 - 1.96 \times T/L) \quad \text{Expression 4}$$

Example 2

A slab containing, by mass %, C: 0.08%, S: 0.023%, acid-soluble Al: 0.03%, and N: 0.008% with a remainder including Si and Mn in contents shown in Table 3 and Table 4, Fe, and an impurity was produced. The slab was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled, and then cold-rolled, thereby obtaining a cold-rolled steel sheet having a sheet thickness of 0.23 mm.

Subsequently, the temperature of the obtained cold-rolled steel sheet was rapidly increased at a temperature increase velocity V (° C./s) shown in Table 3 and Table 4, and then decarburization annealing was carried out at 850° C. for 180 seconds in a wet hydrogen-nitrogen atmosphere. As the average temperature increase velocity V (° C./s), the average value of temperature increase velocities in a temperature range of 550° C. to 700° C. was used, and, in the temperature increase process for primary recrystallization annealing, a steel sheet tensile force S of 7.84 N/mm$^2$ was imparted in the sheet travelling direction of the cold-rolled steel sheet. In addition, the amount of temperature increased T was set to 400° C., and the heated length L was set to 400 mm. The average temperature increase velocity V was computed using the same method as in Example 1.

The annealing separating agent including MgO was applied to the surface of the cold-rolled steel sheet after primary recrystallization annealing, then, final annealing was carried out to obtain final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less.

For the grain-oriented electrical steel sheet obtained using the above-described method, the iron loss Wp, the magnetic flux density B8 value, the number of wrinkles having a steepness of 0.01 or more present per meter in the sheet width direction, the component composition of the silicon steel sheet, and the average grain size of secondary recrystallized grains were measured using the same methods as in Example 1.

In a case where the iron loss Wp was 0.800 or less and the presence proportion of the wrinkles was 0 winkles/m or more and 10 wrinkles/m or less, the grain-oriented electrical steel sheet was determined as pass. In the case of failing to satisfy any one of these conditions, the grain-oriented electrical steel sheet was determined as fail and expressed as "C" in the evaluation column in tables. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 3 and Table 4. For invention examples, in the component composition of the silicon steel sheet, the total amount of S and Se was 0.005% or less, the amount of acid-soluble Al was 0.01% or less, the amount of N was 0.005% or less, and the remainder was Fe and an impurity.

TABLE 3

| | Slab component | | Primary recrystallization annealing | | | | | Presence proportion |
| --- | --- | --- | --- | --- | --- | --- | --- | --- |
| Condition | Si (%) | Mn (%) | Temperature increase velocity V (° C./s) | Steel sheet tensile force S (N/mm²) | Amount of temperature increased T (° C.) | Heated length L (mm) | T/L (° C./mm) | of wrinkles (wrinkles/m) |
| B1 | 2.0 | 0.10 | 1000 | 7.84 | 400 | 400 | 1 | 5 |
| B2 | 2.5 | 0.10 | 1000 | 7.84 | 400 | 400 | 1 | 5 |
| B3 | 3.3 | 0.10 | 1000 | 7.84 | 400 | 400 | 1 | 5 |
| B4 | 4.5 | 0.10 | 1000 | 7.84 | 400 | 400 | 1 | 5 |
| B5 | 5.0 | 0.10 | — | — | — | — | — | — |
| B6 | 3.3 | <0.01 | 1000 | 7.84 | 400 | 400 | 1 | 5 |
| B7 | 3.3 | 0.01 | 1000 | 7.84 | 400 | 400 | 1 | 5 |
| B8 | 3.3 | 0.05 | 1000 | 7.84 | 400 | 400 | 1 | 5 |
| B9 | 3.3 | 0.15 | 1000 | 7.84 | 400 | 400 | 1 | 5 |
| B10 | 3.3 | 0.20 | 1000 | 7.84 | 400 | 400 | 1 | 5 |
| B11 | 2.5 | 0.10 | 100 | 7.84 | 400 | 400 | 1 | 5 |
| B12 | 2.5 | 0.10 | 400 | 7.84 | 400 | 400 | 1 | 5 |
| B13 | 2.5 | 0.10 | 700 | 7.84 | 400 | 400 | 1 | 5 |
| B14 | 2.5 | 0.10 | 1500 | 7.84 | 400 | 400 | 1 | 5 |
| B15 | 2.5 | 0.10 | 2500 | 7.84 | 400 | 400 | 1 | 6 |

| | Silicon steel sheet | | | | | | |
| --- | --- | --- | --- | --- | --- | --- | --- |
| Condition | Iron loss Wp (W/kg) | Magnetic flux density B8 value (T) | Average grain size of secondary recrystallized grains (mm) | Si (%) | Mn (%) | Evaluation | Note |
| B1 | 0.802 | 1.939 | 27 | 2.0 | 0.10 | C | Comparative Example |
| B2 | 0.785 | 1.937 | 27 | 2.5 | 0.10 | S | Invention Example |
| B3 | 0.784 | 1.935 | 27 | 3.3 | 0.10 | S | Invention Example |
| B4 | 0.783 | 1.931 | 27 | 4.5 | 0.10 | S | Invention Example |
| B5 | — | — | — | — | — | C (Rolling impossible) | Comparative Example |
| B6 | 0.933 | 1.867 | 9 | 3.3 | <0.01 | C | Comparative Example |
| B7 | 0.785 | 1.935 | 27 | 3.3 | 0.01 | S | Invention Example |
| B8 | 0.785 | 1.935 | 27 | 3.2 | 0.05 | S | Invention Example |
| B9 | 0.785 | 1.935 | 27 | 3.3 | 0.15 | S | Invention Example |
| B10 | 1.026 | 1.841 | 8 | 3.3 | 0.20 | C | Comparative Example |
| B11 | 0.858 | 1.936 | 58 | 2.5 | 0.10 | C | Comparative Example |
| B12 | 0.798 | 1.936 | 45 | 2.5 | 0.10 | B | Invention Example |
| B13 | 0.789 | 1.936 | 35 | 2.5 | 0.10 | A | Invention Example |
| B14 | 0.784 | 1.938 | 25 | 2.5 | 0.10 | S | Invention Example |
| B15 | 0.779 | 1.938 | 21 | 2.5 | 0.10 | S | Invention Example |

TABLE 4

| Condition | Slab component | | Primary recrystallization annealing | | | | | Presence proportion of wrinkles (wrinkles/m) |
|---|---|---|---|---|---|---|---|---|
| | Si (%) | Mn (%) | Temperature increase velocity V (° C./s) | Steel sheet tensile force S (N/mm²) | Amount of temperature increased T (° C.) | Heated length L (mm) | T/L (° C./mm) | |
| B16 | 4.5 | 0.10 | 100 | 7.84 | 400 | 400 | 1 | 5 |
| B17 | 4.5 | 0.10 | 400 | 7.84 | 400 | 400 | 1 | 5 |
| B18 | 4.5 | 0.10 | 700 | 7.84 | 400 | 400 | 1 | 5 |
| B19 | 4.5 | 0.10 | 1500 | 7.84 | 400 | 400 | 1 | 5 |
| B20 | 4.5 | 0.10 | 2500 | 7.84 | 400 | 400 | 1 | 5 |
| B21 | 3.3 | 0.01 | 100 | 7.84 | 400 | 400 | 1 | 5 |
| B22 | 3.3 | 0.01 | 400 | 7.84 | 400 | 400 | 1 | 5 |
| B23 | 3.3 | 0.01 | 700 | 7.84 | 400 | 400 | 1 | 5 |
| B24 | 3.3 | 0.01 | 1500 | 7.84 | 400 | 400 | 1 | 5 |
| B25 | 3.3 | 0.01 | 2500 | 7.84 | 400 | 400 | 1 | 5 |
| B26 | 3.3 | 0.15 | 100 | 7.84 | 400 | 400 | 1 | 5 |
| B27 | 3.3 | 0.15 | 400 | 7.84 | 400 | 400 | 1 | 5 |
| B28 | 3.3 | 0.15 | 700 | 7.84 | 400 | 400 | 1 | 5 |
| B29 | 3.3 | 0.15 | 1500 | 7.84 | 400 | 400 | 1 | 5 |
| B30 | 3.3 | 0.15 | 2500 | 7.84 | 400 | 400 | 1 | 6 |

| Condition | Silicon steel sheet | | | | | Evaluation | Note |
|---|---|---|---|---|---|---|---|
| | Iron loss Wp (W/kg) | Magnetic flux density B8 value (T) | Average grain size of secondary recrystallized grains (mm) | Si (%) | Mn (%) | | |
| B16 | 0.838 | 1.930 | 54 | 4.5 | 0.10 | C | Comparative Example |
| B17 | 0.796 | 1.930 | 42 | 4.5 | 0.10 | B | Invention Example |
| B18 | 0.787 | 1.930 | 33 | 4.5 | 0.10 | A | Invention Example |
| B19 | 0.782 | 1.931 | 22 | 4.5 | 0.10 | S | Invention Example |
| B20 | 0.774 | 1.931 | 18 | 4.5 | 0.10 | S | Invention Example |
| B21 | 0.861 | 1.933 | 53 | 3.3 | 0.01 | C | Comparative Example |
| B22 | 0.799 | 1.933 | 42 | 3.3 | 0.01 | B | Invention Example |
| B23 | 0.790 | 1.934 | 32 | 3.3 | 0.01 | A | Invention Example |
| B24 | 0.784 | 1.935 | 22 | 3.2 | 0.01 | S | Invention Example |
| B25 | 0.779 | 1.935 | 18 | 3.3 | 0.01 | S | Invention Example |
| B26 | 0.850 | 1.933 | 52 | 3.2 | 0.15 | C | Comparative Example |
| B27 | 0.799 | 1.933 | 41 | 3.3 | 0.15 | B | Invention Example |
| B28 | 0.790 | 1.934 | 32 | 3.2 | 0.15 | A | Invention Example |
| B29 | 0.784 | 1.935 | 22 | 3.3 | 0.15 | S | Invention Example |
| B30 | 0.778 | 1.935 | 18 | 3.3 | 0.15 | S | Invention Example |

When the results in Table 3 and Table 4 are referred to, it was found that the grain-oriented electrical steel sheets containing, by mass %, Si: 2.5% or more and 4.5% or less and Mn: 0.01% or more and 0.15% or less were evaluated as B or higher (favorable or higher). In addition, in invention examples in which the average temperature increase velocity V in a temperature range of 550° C. to 700° C. in the primary recrystallization annealing was 700° C./s or more, it was found that the iron loss Wp reached 0.790 W/kg or less, and the evaluation was A or higher (more favorable or higher). Furthermore, in invention examples in which the average temperature increase velocity V in a temperature range of 550° C. to 700° C. in the primary recrystallization annealing was 1,000° C./s or more, it was found that the iron loss Wp reached 0.785 W/kg or less, and the evaluation was S (extremely favorable). Under Condition B5, the amount of Si was too large, and it was not possible to carry out hot rolling and manufacture a grain-oriented electrical steel sheet, and thus the grain-oriented electrical steel sheet was determined as fail, and "C (rolling impossible)" was given to the evaluation column.

Example 3

A slab containing, by mass %, C: 0.08%, Si: 3.3%, Mn: 0.08%, S: 0.024%, acid-soluble Al: 0.03%, and N: 0.008% with a remainder including Fe and an impurity was produced. The slab was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled, and then cold-rolled, thereby obtaining a cold-rolled steel sheet having a sheet thickness of 0.23 mm.

Subsequently, the temperature of the obtained cold-rolled steel sheet was rapidly increased at an average temperature increase velocity V (° C./s) shown in Table 5 and Table 6, and then decarburization annealing was carried out at 850° C. for 180 seconds in a wet hydrogen-nitrogen atmosphere. As the temperature increase velocity V (° C./s), the average value of temperature increase velocities in a temperature range of 550° C. to 700° C. was used. In addition, in the temperature increase process for primary recrystallization annealing, the steel sheet tensile force S (N/mm$^2$), the amount of temperature increased T (° C.), and the heated length L (mm) were changed as shown in Table 5 and Table 6. The average temperature increase velocity V was computed using the same method as in Example 1.

The annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less.

For the grain-oriented electrical steel sheet obtained using the above-described method, the iron loss Wp, the magnetic flux density B8 value, the number of wrinkles having a steepness of 0.01 or more present per meter in the sheet width direction, the component composition of the silicon steel sheet, and the average grain size of secondary recrystallized grains were measured using the same methods as in Example 1.

In a case where the iron loss Wp was 0.800 or less and the presence proportion of the wrinkles was 0 winkles/m or more and 10 wrinkles/m or less, the grain-oriented electrical steel sheet was determined as pass. In the case of failing to satisfy any one of these conditions, the grain-oriented electrical steel sheet was determined as fail and expressed as "C" in the evaluation column in tables. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 5 and Table 6. For invention examples, in the component composition of the silicon steel sheet, the total amount of S and Se was 0.005% or less, the amount of acid-soluble Al was 0.01% or less, the amount of N was 0.005% or less, and the remainder was Fe and an impurity.

TABLE 5

| | Primary recrystallization annealing | | | | | |
|---|---|---|---|---|---|---|
| Condition | Temperature increase velocity V (° C./s) | Steel sheet tensile force S (N/mm$^2$) | Amount of temperature increased T (° C.) | Heated length L (mm) | T/L (° C./mm) | Presence proportion of wrinkles (wrinkles/m) |
| C1 | 100 | 1.96 | 400 | 400 | 1.0 | 3 |
| C2 | 100 | 7.84 | 400 | 400 | 1.0 | 5 |
| C3 | 100 | 11.76 | 400 | 400 | 1.0 | 7 |
| C4 | 100 | 15.90 | 400 | 400 | 1.0 | 9 |
| C5 | 100 | 19.60 | 400 | 400 | 1.0 | 11 |
| C6 | 100 | 23.52 | 400 | 400 | 1.0 | 13 |
| C7 | 400 | 1.96 | 400 | 400 | 1.0 | 3 |
| C8 | 400 | 7.84 | 400 | 400 | 1.0 | 6 |
| C9 | 400 | 11.76 | 400 | 400 | 1.0 | 7 |
| C10 | 400 | 15.90 | 400 | 400 | 1.0 | 9 |
| C11 | 400 | 19.60 | 400 | 400 | 1.0 | 11 |
| C12 | 400 | 23.52 | 400 | 400 | 1.0 | 13 |
| C13 | 700 | 1.96 | 400 | 400 | 1.0 | 3 |
| C14 | 700 | 7.84 | 400 | 400 | 1.0 | 6 |
| C15 | 700 | 11.76 | 400 | 400 | 1.0 | 7 |
| C16 | 700 | 15.90 | 400 | 400 | 1.0 | 9 |
| C17 | 700 | 19.60 | 400 | 400 | 1.0 | 11 |
| C18 | 700 | 23.52 | 400 | 400 | 1.0 | 13 |
| C19 | 1000 | 1.96 | 400 | 400 | 1.0 | 3 |
| C20 | 1000 | 7.84 | 400 | 400 | 1.0 | 6 |
| C21 | 1000 | 11.76 | 400 | 400 | 1.0 | 7 |

| | | | Silicon steel sheet | | | | |
|---|---|---|---|---|---|---|---|
| Condition | Iron loss Wp (w/kg) | Magnetic flux density B8 value (T) | Average grain size of secondary recrystallized grains (mm) | Si (%) | Mn (%) | Evaluation | Note |
| C1 | 0.844 | 1.934 | 56 | 3.2 | 0.08 | C | Comparative Example |

TABLE 5-continued

| | | | | | | | |
|---|---|---|---|---|---|---|---|
| C2 | 0.843 | 1.934 | 55 | 3.2 | 0.08 | C | Comparative Example |
| C3 | 0.850 | 1.933 | 55 | 3.2 | 0.08 | C | Comparative Example |
| C4 | 0.852 | 1.933 | 53 | 3.2 | 0.08 | C | Comparative Example |
| C5 | 0.855 | 1.932 | 52 | 3.2 | 0.08 | C | Comparative Example |
| C6 | 0.876 | 1.930 | 51 | 3.2 | 0.08 | C | Comparative Example |
| C7 | 0.798 | 1.934 | 46 | 3.2 | 0.08 | B | Invention Example |
| C8 | 0.797 | 1.934 | 44 | 3.2 | 0.08 | B | Invention Example |
| C9 | 0.798 | 1.934 | 43 | 3.2 | 0.08 | B | Invention Example |
| C10 | 0.799 | 1.933 | 42 | 3.2 | 0.08 | B | Invention Example |
| C11 | 0.799 | 1.931 | 41 | 3.2 | 0.08 | C | Comparative Example |
| C12 | 0.810 | 1.929 | 41 | 3.2 | 0.08 | C | Comparative Example |
| C13 | 0.788 | 1.934 | 36 | 3.2 | 0.08 | A | Invention Example |
| C14 | 0.789 | 1.934 | 35 | 3.2 | 0.08 | A | Invention Example |
| C15 | 0.788 | 1.934 | 33 | 3.2 | 0.08 | A | Invention Example |
| C16 | 0.789 | 1.932 | 32 | 3.2 | 0.08 | A | Invention Example |
| C17 | 0.808 | 1.929 | 29 | 3.2 | 0.08 | C | Comparative Example |
| C18 | 0.829 | 1.924 | 25 | 3.2 | 0.08 | C | Comparative Example |
| C19 | 0.783 | 1.936 | 28 | 3.2 | 0.08 | S | Invention Example |
| C20 | 0.785 | 1.935 | 27 | 3.2 | 0.08 | S | Invention Example |
| C21 | 0.784 | 1.936 | 26 | 3.2 | 0.08 | S | Invention Example |

TABLE 6

| | Primary recrystallization annealing | | | | | Presence proportion of wrinkles (wrinkles/m) |
|---|---|---|---|---|---|---|
| Condition | Temperature increase velocity V (° C./s) | Steel sheet tensile force S (N/mm²) | Amount of temperature increased T (° C.) | Heated length L (mm) | T/L (° C./mm) | |
| C22 | 1000 | 15.90 | 400 | 400 | 1.0 | 9 |
| C23 | 1000 | 19.60 | 400 | 400 | 1.0 | 11 |
| C24 | 1000 | 23.52 | 400 | 400 | 1.0 | 13 |
| C25 | 1500 | 1.96 | 400 | 400 | 1.0 | 3 |
| C26 | 1500 | 7.84 | 400 | 400 | 1.0 | 6 |
| C27 | 1500 | 11.76 | 400 | 400 | 1.0 | 7 |
| C28 | 1500 | 15.90 | 400 | 400 | 1.0 | 9 |
| C29 | 1500 | 19.60 | 400 | 400 | 1.0 | 11 |
| C30 | 1500 | 23.52 | 400 | 400 | 1.0 | 14 |
| C31 | 2500 | 1.96 | 400 | 400 | 1.0 | 4 |
| C32 | 2500 | 7.84 | 400 | 400 | 1.0 | 6 |
| C33 | 2500 | 11.76 | 400 | 400 | 1.0 | 7 |
| C34 | 2500 | 15.90 | 400 | 400 | 1.0 | 9 |
| C35 | 2500 | 19.60 | 400 | 400 | 1.0 | 11 |
| C36 | 2500 | 23.52 | 400 | 400 | 1.0 | 14 |
| C37 | 1000 | 7.84 | 250 | 150 | 1.7 | 7 |
| C38 | 1000 | 7.84 | 400 | 150 | 2.7 | 8 |
| C39 | 1000 | 7.84 | 600 | 150 | 4.0 | 10 |
| C40 | 1000 | 7.84 | 700 | 150 | 4.7 | 12 |
| C41 | 1000 | 7.84 | 850 | 150 | 5.7 | 15 |

TABLE 6-continued

| Condition | Silicon steel sheet | | | | | | Note |
|---|---|---|---|---|---|---|---|
| | Iron loss Wp (W/kg) | Magnetic flux density B8 value (T) | Average grain size of secondary recrystallized grains (mm) | Si (%) | Mn (%) | Evaluation | |
| C22 | 0.811 | 1.928 | 23 | 3.2 | 0.08 | C | Comparative Example |
| C23 | 0.833 | 1.922 | 22 | 3.2 | 0.08 | C | Comparative Example |
| C24 | 0.860 | 1.919 | 20 | 3.2 | 0.08 | C | Comparative Example |
| C25 | 0.784 | 1.936 | 25 | 3.2 | 0.08 | S | Invention Example |
| C26 | 0.784 | 1.936 | 25 | 3.2 | 0.08 | S | Invention Example |
| C27 | 0.784 | 1.936 | 24 | 3.2 | 0.08 | S | Invention Example |
| C28 | 0.814 | 1.927 | 21 | 3.2 | 0.08 | C | Comparative Example |
| C29 | 0.837 | 1.921 | 20 | 3.2 | 0.08 | C | Comparative Example |
| C30 | 0.869 | 1.918 | 19 | 3.2 | 0.08 | C | Comparative Example |
| C31 | 0.776 | 1.936 | 22 | 3.2 | 0.08 | S | Invention Example |
| C32 | 0.777 | 1.936 | 22 | 3.2 | 0.08 | S | Invention Example |
| C33 | 0.778 | 1.936 | 21 | 3.2 | 0.08 | S | Invention Example |
| C34 | 0.818 | 1.926 | 18 | 3.2 | 0.08 | C | Comparative Example |
| C35 | 0.840 | 1.920 | 17 | 3.2 | 0.08 | C | Comparative Example |
| C36 | 0.876 | 1.917 | 15 | 3.2 | 0.08 | C | Comparative Example |
| C37 | 0.785 | 1.935 | 27 | 3.2 | 0.08 | S | Invention Example |
| C38 | 0.785 | 1.935 | 27 | 3.2 | 0.08 | S | Invention Example |
| C39 | 0.784 | 1.934 | 26 | 3.2 | 0.08 | S | Invention Example |
| C40 | 0.784 | 1.934 | 26 | 3.2 | 0.08 | C | Comparative Example |
| C41 | 0.785 | 1.934 | 26 | 3.2 | 0.08 | C | Comparative Example |

When the results in Table 5 and Table 6 are referred to, it was found that the grain-oriented electrical steel sheets in which the average grain size of secondary recrystallized grains was 10 mm or more and 50 mm or less and the magnetic flux density B8 was 1.930 T or more were evaluated as B or higher (favorable or higher). In addition, in invention examples in which the average temperature increase velocity V in a temperature range of 550° C. to 700° C. in the primary recrystallization annealing was 700° C./s or more, it was found that the iron loss Wp reached 0.790 W/kg or less, and the evaluation was A or higher (more favorable or higher). Furthermore, in invention examples in which the average temperature increase velocity V in a temperature range of 550° C. to 700° C. in the primary recrystallization annealing was 1,000° C./s or more, it was found that the iron loss Wp reached 0.785 W/kg or less, and the evaluation was S (extremely favorable).

Example 4

A slab containing, by mass %, C: 0.08%, Si: 3.3%, Mn: 0.08%, S: 0.005%, Se: 0.019%, acid-soluble Al: 0.03%, and N: 0.008% with a remainder including Fe and an impurity was produced. The slab was heated at 1,350° C. for one hour and then hot-rolled, thereby obtaining a hot-rolled steel sheet having a sheet thickness of 2.1 mm. The obtained hot-rolled steel sheet was subjected to hot-rolled sheet annealing in which the hot-rolled steel sheet was annealed at a peak temperature of 1,100° C. for 140 seconds, pickled, and then cold-rolled, thereby obtaining a cold-rolled steel sheet. In the cold rolling, the cumulative rolling reduction was controlled such that the grain-oriented electrical steel sheet obtained in the end had a sheet thickness shown in Table 7.

The temperature of the obtained cold-rolled steel sheet was rapidly increased such that the average temperature increase velocity V in a temperature range of 550° C. to 700° C. reached 1,000° C./s, and then decarburization annealing was carried out at 850° C. for 180 seconds in a wet hydrogen-nitrogen atmosphere. In the temperature increase process for primary recrystallization annealing, the steel sheet tensile force S was set to 7.84 N/mm$^2$, the amount of temperature increased T was set to 400° C., and the heated length L was set to 400 mm. The average temperature increase velocity V was computed using the same method as in Example 1.

The annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the flattening of the steel sheet was carried out, thereby obtaining a grain-oriented electrical steel sheet having a sheet thickness of 0.15 mm or more and 0.23 mm or less.

For the grain-oriented electrical steel sheet obtained using the above-described method, the iron loss Wp, the magnetic flux density B8 value, the number of wrinkles having a steepness of 0.01 or more present per meter in the sheet width direction, the component composition of the silicon steel sheet, and the average grain size of secondary recrystallized grains were measured using the same methods as in Example 1.

In a case where the iron loss Wp was 0.800 or less and the presence proportion of the wrinkles was 0 wrinkles/m or more and 10 wrinkles/m or less, the grain-oriented electrical steel sheet was determined as pass. In the case of failing to satisfy any one of these conditions, the grain-oriented electrical steel sheet was determined as fail and expressed as "C" in the evaluation column in tables. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 7. For invention examples, in the component composition of the silicon steel sheet, the total amount of S and Se was 0.005% or less, the amount of acid-soluble Al was 0.01% or less, the amount of N was 0.005% or less, and the remainder was Fe and an impurity.

with a remainder including Fe and an impurity was produced. The slab was heated at 1,350° C. for one hour and then hot-rolled, thereby obtaining a hot-rolled steel sheet having a sheet thickness of 2.3 mm. The obtained hot-rolled steel sheet was subjected to hot-rolled sheet annealing in which the hot-rolled steel sheet was annealed at a peak temperature of 1,100° C. for 140 seconds, pickled, and then cold-rolled, thereby obtaining a cold-rolled steel sheet having a sheet thickness of 0.23 mm.

Subsequently, the temperature of the obtained cold-rolled steel sheet was rapidly increased at an average temperature increase velocity V (° C./s) shown in Table 8, and then decarburization annealing was carried out at 850° C. for 180 seconds in a wet hydrogen-nitrogen atmosphere. As the average temperature increase velocity V (° C./s), the average value of temperature increase velocities in a temperature range of 550° C. to 700 was used, and, between rapid temperature increases for primary recrystallization annealing, a steel sheet tensile force S of 7.84 N/mm$^2$ was imparted in the sheet travelling direction of the cold-rolled steel sheet. In addition, the number of temperature increase devices at the time of primary recrystallization annealing including a temperature increase process in a temperature range of 550° C. to 700° C., the amount of temperature increased T (° C.), and the heated length L (mm) were changed as shown in Table 8. The average temperature increase velocity V was computed using the same method as in Example 1.

The annealing separating agent including MgO was applied to the surface of the cold-rolled steel sheet after primary recrystallization annealing, then, final annealing was carried out to obtain a final-annealed sheet, and this final-annealed sheet was washed with water. After that, an insulating coating containing aluminum phosphate and colloidal silica as main components was applied to the surface of the final-annealed sheet, and then flattening annealing intended for the baking of the insulating coating and the

TABLE 7

| Condition | Sheet thickness (mm) | Presence proportion of wrinkles (wrinkles/m) | Iron loss Wp (W/kg) | Magnetic flux density B8 value (T) | Average grain size of secondary recrystallized grains (mm) | Si (%) | Mn (%) | Evaluation | Note |
|---|---|---|---|---|---|---|---|---|---|
| D1 | 0.13 | 6 | 1.202 | 1.733 | 5 | 3.2 | 0.08 | C | Comparative Example |
| D2 | 0.15 | 6 | 0.690 | 1.932 | 49 | 3.2 | 0.08 | S | Invention Example |
| D3 | 0.18 | 6 | 0.716 | 1.932 | 43 | 3.2 | 0.08 | S | Invention Example |
| D4 | 0.20 | 6 | 0.753 | 1.933 | 35 | 3.2 | 0.08 | S | Invention Example |
| D5 | 0.23 | 6 | 0.782 | 1.934 | 28 | 3.3 | 0.08 | S | Invention Example |
| D6 | 0.27 | 6 | 0.823 | 1.935 | 23 | 3.3 | 0.08 | C | Comparative Example |

When Table 7 is referred to, it was found that the grain-oriented electrical steel sheets having a sheet thickness of 0.15 mm or more and 0.23 mm or less were evaluated as B or higher (favorable or higher).

Example 5

A slab containing, by mass %, C: 0.08%, Si: 3.3%, Mn: 0.08%, S: 0.023%, acid-soluble Al: 0.03%, and N: 0.008% flattening of the steel sheet was carried out, thereby obtaining a grain-oriented electrical steel sheet having a sheet thickness of 0.15 mm or more and 0.23 mm or less.

For the grain-oriented electrical steel sheet obtained using the above-described method, the iron loss Wp, the magnetic flux density B8 value, the number of wrinkles having a steepness of 0.01 or more present per meter in the sheet width direction, the component composition of the silicon steel sheet, and the average grain size of secondary recrystallized grains were measured using the same methods as in Example 1.

In a case where the iron loss Wp was 0.800 or less and the presence proportion of the wrinkles was 0 winkles/m or more and 10 wrinkles/m or less, the grain-oriented electrical steel sheet was determined as pass. In the case of failing to satisfy any one of these conditions, the grain-oriented electrical steel sheet was determined as fail and expressed as "C" in the evaluation column in tables. In addition, the iron losses Wp of examples determined as pass were evaluated as S (extremely favorable), A (more favorable), or B (favorable) on the basis of the same standards as in Example 1.

The manufacturing conditions, measurement results, and evaluation results of the grain-oriented electrical steel sheets are shown in Table 8. For invention examples, in the component composition of the silicon steel sheet, the total amount of S and Se was 0.005% or less, the amount of acid-soluble Al was 0.01% or less, the amount of N was 0.005% or less, and the remainder was Fe and an impurity.

TABLE 8

| | Primary recrystallization annealing | | | | | | |
|---|---|---|---|---|---|---|---|
| Condition | Temperature increase velocity V (° C./s) | Steel sheet tensile force S (N/mm$^2$) | Temperature increase device (devices) | Amount of temperature increased T (° C.) | Heated length L (mm) | T/L (° C./mm) | Presence proportion of wrinkles (wrinkles/m) |
| E1 | 400 | 7.84 | 1 | 600 | 150 | 4.0 | 10 |
| E2 | 400 | 7.84 | 1 | 600 | 400 | 1.5 | 6 |
| E3 | 400 | 7.84 | 2 | 600 | 650 | 0.9 | 5 |
| E4 | 400 | 7.84 | 2 | 600 | 750 | 0.8 | 5 |
| E5 | 400 | 7.84 | 2 | 600 | 850 | 0.7 | 5 |
| E6 | 700 | 7.84 | 1 | 600 | 150 | 4.0 | 10 |
| E7 | 700 | 7.84 | 1 | 600 | 400 | 1.5 | 6 |
| E8 | 700 | 7.84 | 2 | 600 | 650 | 0.9 | 5 |
| E9 | 700 | 7.84 | 2 | 600 | 750 | 0.8 | 5 |
| E10 | 700 | 7.84 | 2 | 600 | 850 | 0.7 | 5 |
| E11 | 1000 | 7.84 | 1 | 600 | 150 | 4.0 | 10 |
| E12 | 1000 | 7.84 | 1 | 600 | 400 | 1.5 | 6 |
| E13 | 1000 | 7.84 | 2 | 600 | 650 | 0.9 | 5 |
| E14 | 1000 | 7.84 | 2 | 600 | 750 | 0.8 | 5 |
| E15 | 1000 | 7.84 | 2 | 600 | 850 | 0.7 | 5 |

| | | | Silicon steel sheet | | | | |
|---|---|---|---|---|---|---|---|
| Condition | Iron loss Wp (W/kg) | Magnetic flux density B8 value (T) | Average grain size of secondary recrystallized grains (mm) | Si (%) | Mn (%) | Evaluation | Note |
| E1 | 0.798 | 1.934 | 44 | 3.3 | 0.08 | B | Invention Example |
| E2 | 0.797 | 1.934 | 44 | 3.3 | 0.08 | B | Invention Example |
| E3 | 0.797 | 1.934 | 44 | 3.3 | 0.08 | B | Invention Example |
| E4 | 0.797 | 1.934 | 45 | 3.3 | 0.08 | B | Invention Example |
| E5 | 0.797 | 1.934 | 45 | 3.3 | 0.08 | B | Invention Example |
| E6 | 0.790 | 1.934 | 35 | 3.3 | 0.08 | A | Invention Example |
| E7 | 0.789 | 1.934 | 35 | 3.3 | 0.08 | A | Invention Example |
| E8 | 0.789 | 1.934 | 35 | 3.3 | 0.08 | A | Invention Example |
| E9 | 0.789 | 1.934 | 35 | 3.3 | 0.08 | A | Invention Example |
| E10 | 0.789 | 1.934 | 36 | 3.3 | 0.08 | A | Invention Example |
| E11 | 0.784 | 1.935 | 27 | 3.3 | 0.08 | S | Invention Example |
| E12 | 0.784 | 1.935 | 27 | 3.3 | 0.08 | S | Invention Example |
| E13 | 0.783 | 1.935 | 27 | 3.3 | 0.08 | S | Invention Example |
| E14 | 0.784 | 1.935 | 27 | 3.3 | 0.08 | S | Invention Example |
| E15 | 0.784 | 1.935 | 28 | 3.3 | 0.08 | S | Invention Example |

When Table 8 is referred to, it was found that the grain-oriented electrical steel sheets satisfying the conditions regulated by the present invention (invention examples) were evaluated as B or higher (favorable or higher). In addition, in invention examples in which the average temperature increase velocity V in a temperature range of 550° C. to 700° C. in the primary recrystallization annealing was 700° C./s or more, it was found that the iron loss Wp reached 0.790 W/kg or less, and the evaluation was A or higher (more favorable or higher). Furthermore, in invention examples in which the average temperature increase velocity V in a temperature range of 550° C. to 700° C. in the primary recrystallization annealing was 1,000° C./s or more, it was found that the iron loss Wp reached 0.785 W/kg or less, and the evaluation was S (more favorable or higher).

In addition, in the invention examples in Table 8, it was found that all of the conditions of the present embodiment were satisfied regardless of the number of temperature increase devices.

Hitherto, the preferred embodiments of the present invention have been described in detail with reference to the accompanying drawings, but the present invention is not limited to such examples. It is evident that a person skilled in the art is able to consider a variety of modification examples or correction examples within the scope of the technical concept described in claims, and it is needless to say that these examples are also understood to belong to the technical concept of the present invention.

INDUSTRIAL APPLICABILITY

According to the one aspect according to the present invention, it is possible to provide a grain-oriented electrical steel sheet having a more favorable surface shape in the case of more rapidly increasing the temperature than in the related art in primary recrystallization annealing and having a decreased iron loss value even when a magnetic domain refinement treatment is not carried out and a manufacturing method therefor.

BRIEF DESCRIPTION OF THE REFERENCE SYMBOLS

1 Steel sheet
10, 21, 22, 31, 32, 41, 42 Temperature increase device

What us claimed is:

1. A method for manufacturing a grain-oriented electrical steel sheet, the method comprising:

a step of heating a slab having
a component composition containing, by mass %,
C: 0.02% or more and 0.10% or less,
Si: 2.5% or more and 4.5% or less,
Mn: 0.01% or more and 0.15% or less,
S and Se in total: 0.001% or more and 0.050% or less,
acid-soluble Al: 0.01% or more and 0.05% or less, and
N: 0.002% or more and 0.015% or less
with a remainder including Fe and an impurity to 1,280° C. to 1,450° C. and carrying out hot rolling to obtain a hot-rolled steel sheet;
a step of, after carrying out hot-rolled steel sheet annealing on the hot-rolled steel sheet, carrying out cold rolling once or carrying out cold rolling twice or more with process annealing therebetween to obtain a cold-rolled steel sheet;
a step of carrying out primary recrystallization annealing on the cold-rolled steel sheet;
a step of applying an annealing separating agent including MgO to a surface of the cold-rolled steel sheet after the primary recrystallization annealing and then carrying out final annealing to obtain a final-annealed sheet; and
a step of applying an insulating coating to the final-annealed sheet and then carrying out flattening annealing,
wherein, in a temperature increase process for the primary recrystallization annealing, an average temperature increase velocity V (° C./s) in a temperature range of 550° C. to 700° C. is 400° C./s or more, T/L (° C./mm) that is a ratio of an amount of temperature increased T (° C.) in a series of temperature increase processes, including a temperature increase in the temperature range of 550° C. to 700° C., to a heated length L (mm) of the series of temperature increase processes is $0.1 \leq T/L \leq 4.0$, a tensile force S (N/mm$^2$) imparted in a sheet travelling direction of the cold-rolled steel sheet is $1.96 \leq S \leq (19.6 - 1.96 \times T/L)$, in the case of $V \leq 1,000$, the tensile force S is $1.96 \leq S \leq (25.5 - 0.0137 \times V)$, and, in the case of $V > 1,000$, the tensile force S is $1.96 \leq S \leq 11.8$.

* * * * *